(12) United States Patent
Nomizu et al.

(10) Patent No.: US 7,545,938 B2
(45) Date of Patent: Jun. 9, 2009

(54) DIGITAL WATERMARKING WHICH ALLOWS TAMPERING TO BE DETECTED ON A BLOCK-SPECIFIC BASIS

(75) Inventors: Yasuyuki Nomizu, Kanagawa (JP); Takanori Yano, Kanagawa (JP); Junichi Hara, Kanagawa (JP); Hiroyuki Sakuyama, Tokyo (JP); Taku Kodama, Kanagawa (JP); Yasuyuki Shinkai, Kanagawa (JP); Toshio Miyazawa, Kanagawa (JP); Nekka Matsuura, Kanagawa (JP); Takayuki Nishimura, Tottori (JP)

(73) Assignee: Ricoh Company Ltd., Tokyo (JP)

( * ) Notice: Subject to any disclaimer, the term of this patent is extended or adjusted under 35 U.S.C. 154(b) by 824 days.

(21) Appl. No.: 10/703,509

(22) Filed: Nov. 10, 2003

(65) Prior Publication Data
US 2005/0053239 A1 Mar. 10, 2005

(30) Foreign Application Priority Data
Nov. 11, 2002 (JP) ............................ 2002-326544

(51) Int. Cl.
*H04N 7/167* (2006.01)
*G06F 11/30* (2006.01)
*H04L 9/00* (2006.01)
(52) U.S. Cl. .................... 380/220; 380/201; 380/202; 380/269; 713/167; 713/176; 713/181; 713/194; 726/1; 726/26; 726/32
(58) Field of Classification Search ................. 713/176; 380/220
See application file for complete search history.

(56) References Cited

U.S. PATENT DOCUMENTS

| 6,192,139 | B1 * | 2/2001 | Tao ............................ 382/100 |
| 6,571,071 | B2 | 5/2003 | Kanoshima et al. |
| 6,618,489 | B1 * | 9/2003 | Miyashita ................... 382/100 |
| 6,647,127 | B1 * | 11/2003 | Aoshima et al. ............ 382/100 |
| 6,671,407 | B1 * | 12/2003 | Venkatesan et al. ......... 382/232 |
| 6,674,982 | B2 | 1/2004 | Saitoh et al. |

(Continued)

OTHER PUBLICATIONS

Japanese Electronic Industry Development Association, 4 pages table of contents, 3 to 37, 50 to 63, 72 to 87 and 94 to 99, "Investigative Report of Digital Watermark Technology", Mar. 1999.

(Continued)

*Primary Examiner*—Kristine Kincaid
*Assistant Examiner*—Jenise E Jackson
(74) *Attorney, Agent, or Firm*—Oblon, Spivak, McClelland, Maier & Neustadt, P.C.

(57) ABSTRACT

An apparatus for generating codes includes a quantization unit which generates quantization coefficients by performing discrete wavelet transform with respect to each of tiles into which an image is divided, a block division unit which divides the quantization coefficients into blocks, a Hash conversion unit which performs Hash conversion based on the quantization coefficients of each of the blocks so as to produce a Hash value for each of the blocks, a digital watermark embedding unit which adjusts a parity of a quantization coefficient of interest equal to a parity of the Hash value of a block to which the quantization coefficient of interest belongs, and a coding unit which generates code sequence data by coding the quantization coefficients including the quantization coefficient whose parity is adjusted.

47 Claims, 13 Drawing Sheets

U.S. PATENT DOCUMENTS

| | | |
|---|---|---|
| 2001/0050778 A1 | 12/2001 | Fukuda et al. |
| 2002/0146123 A1* | 10/2002 | Tian .......................... 380/234 |
| 2002/0159644 A1 | 10/2002 | Sakuyama |
| 2003/0095272 A1 | 5/2003 | Nomizu |
| 2003/0137695 A1 | 7/2003 | Nomizu |
| 2005/0053239 A1 | 3/2005 | Nomizu et al. |

OTHER PUBLICATIONS

Nikkei Business, pp. 68-70, "Prevention of Illegal Coping of Electronic Information", Feb. 23, 1998.

U.S. Appl. No. 12/047,839, filed Mar. 13, 2008, Kodama.

* cited by examiner

0LL
(ORIGINAL IMAGE TILE)

DECOMPOSITION_LEVEL_0

DECOMPOSITION_LEVEL_1

DECOMPOSITION_LEVEL_2

DECOMPOSITION_LEVEL_3

FIG.5B FIG.5C FIG.5D FIG.5E

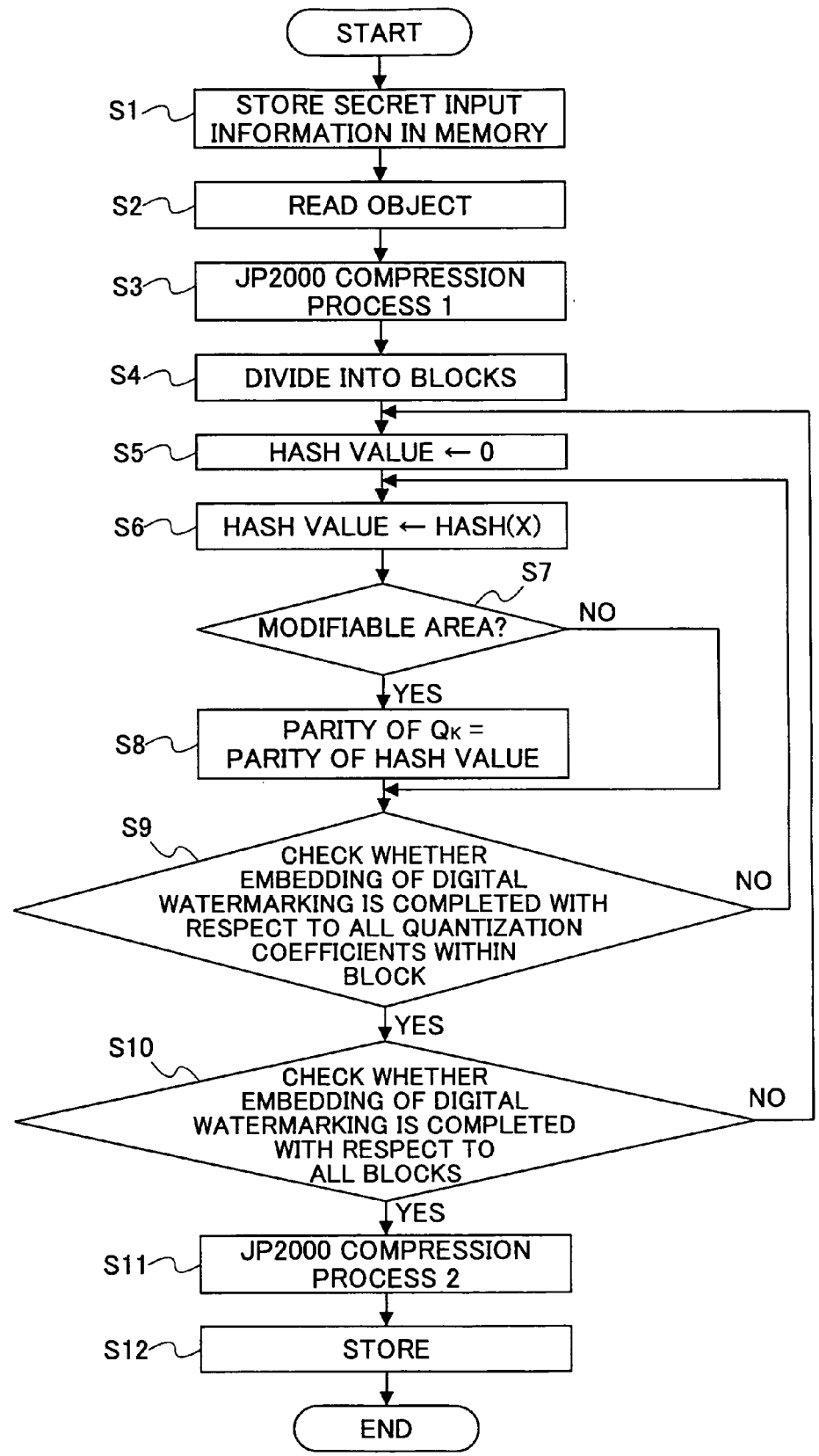

FIG.9A

SEQUENCE OF ORIGINAL QUANTIZATION COEFFICIENTS:

SEQUENCE OF QUANTIZATION COEFFICIENTS WITH EMBEDDED WATERMARKING:

~12, 22, 32, 37, 35, 33, 31, [29], [11], 10, 10~
　　　　　　　　　　　　　　　　↑　　↑
　　　　　　　　　　　　　　$Q_{k+1}$　$Q_k$

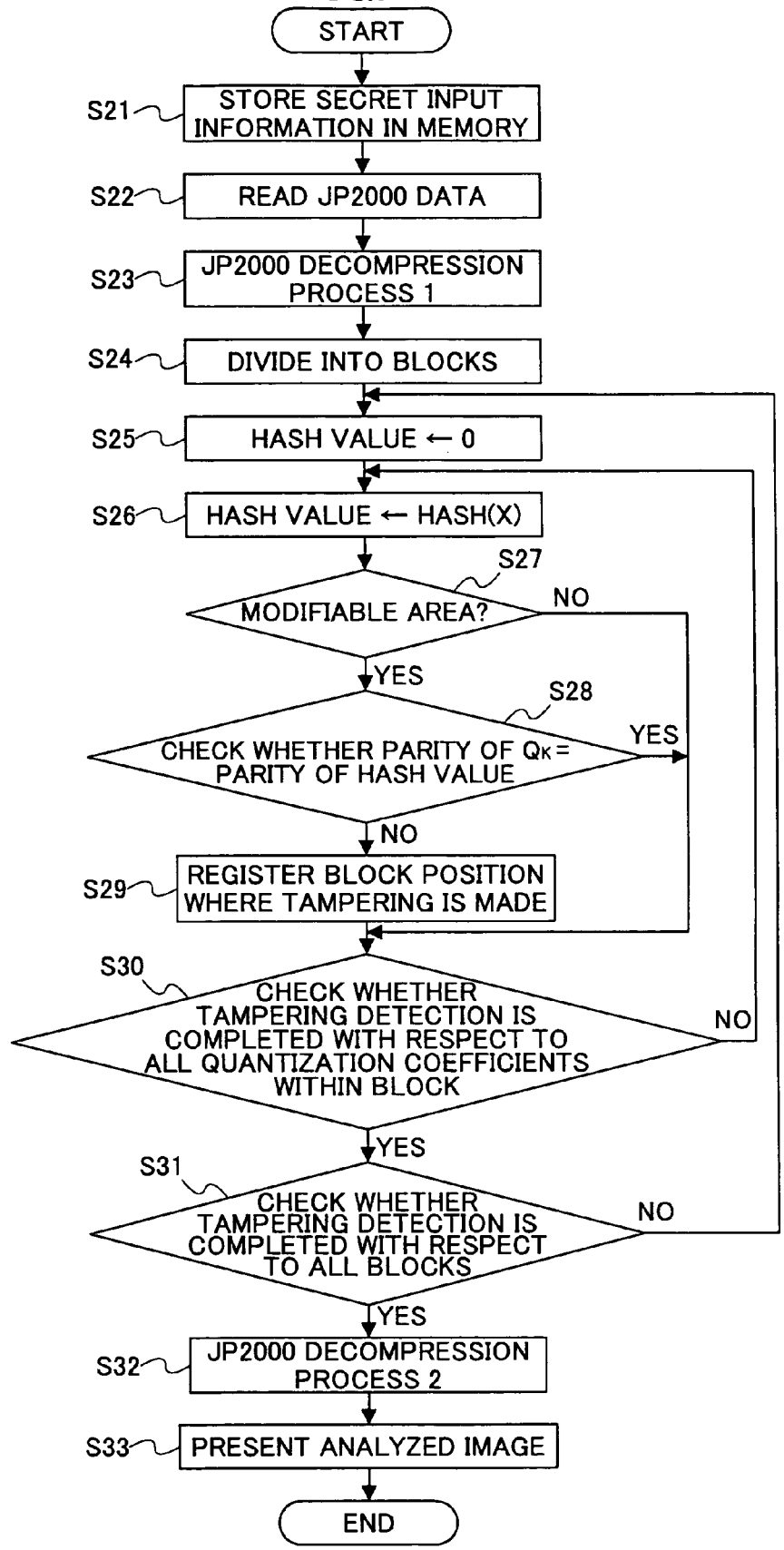

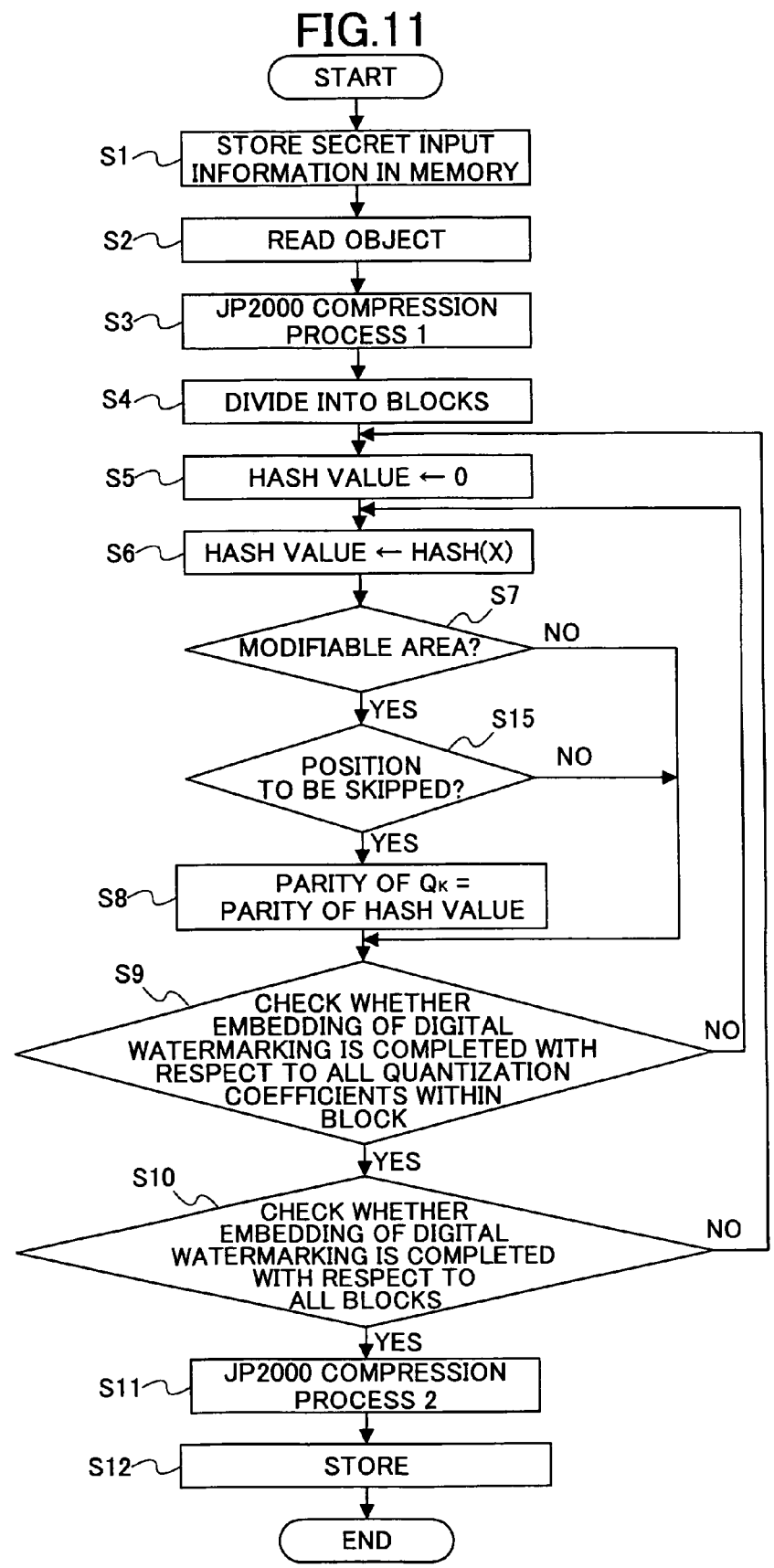

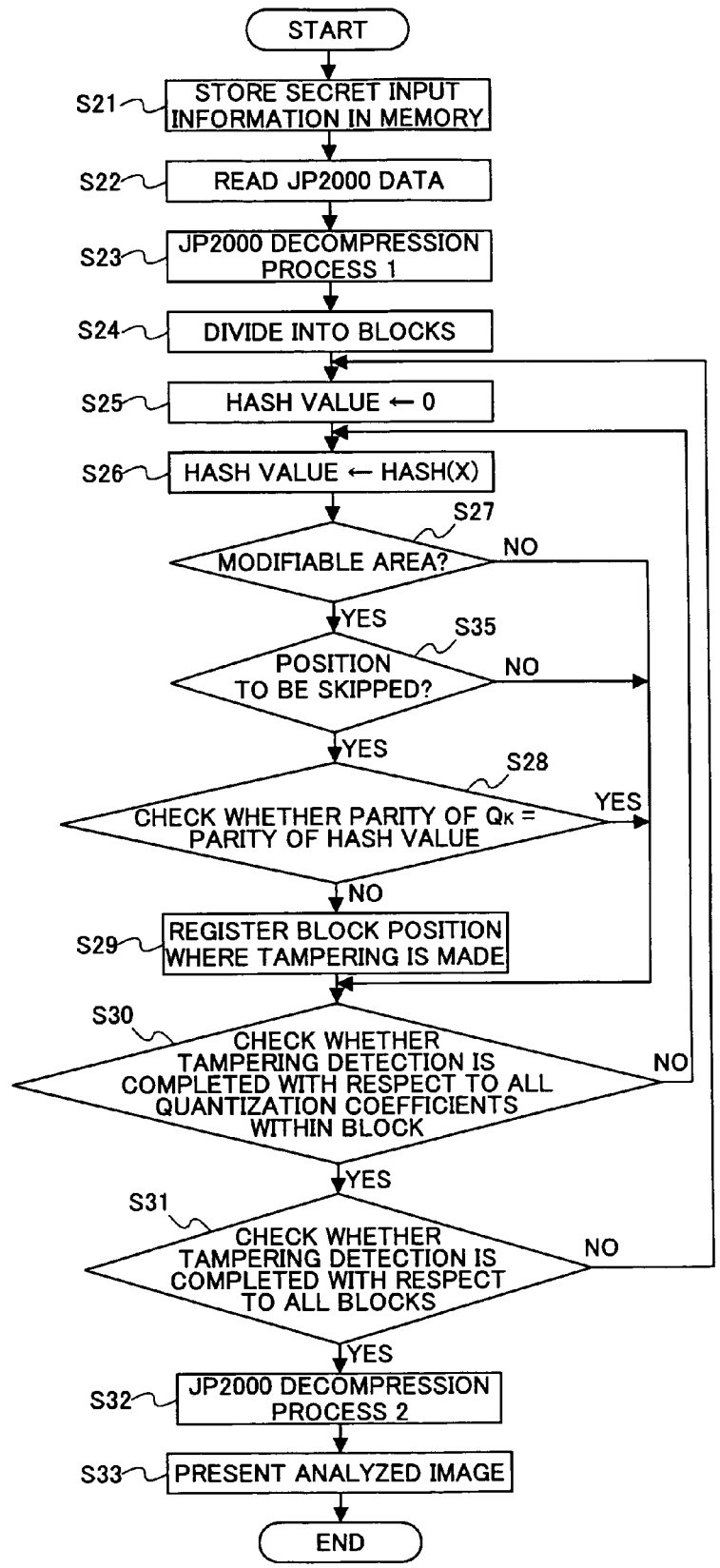

DIGITAL WATERMARKING WHICH ALLOWS TAMPERING TO BE DETECTED ON A BLOCK-SPECIFIC BASIS

BACKGROUND OF THE INVENTION

1. Field of the Invention

This invention relates to a code generating apparatus, an image-processing apparatus, a code generating program, an image-processing program, and a memory medium.

2. Description of the Related Art

Digital information (digital contents) such as digital images can easily be copied by use of computers or the like without degrading information. With the development of digital imaging technology, it is now becoming possible to use digital images or the like acquired by digital cameras or the sort as photographic evidence. Copyright protection or the like may cover such digital contents, so that it may be prohibited to make unauthorized copies and to use the copies of digital contents.

Digital contents are easy to alter through the rewriting of contents by simple modification processing or the like. For this reason, measures are sometimes taken to prevent digital contents from being copied for unauthorized use or being partially altered for use as photographic evidence.

Such measures include a technology that prevents unauthorized use of digital contents through digital watermarking or data hiding, which adds information to the digital contents such as digital images such that the added information is not visible when the digital contents are replayed in an ordinary fashion. This makes it possible to decide whether digital contents are properly used based on digital watermarking embedded into the digital contents.

The use of digital watermarking embedded into digital contents includes the following applications:

A. recording of copyright information;
B. tracing of people who made unauthorized copies;
C. history of IP addresses;
D. prevention of unauthorized copying (invisible and high tolerance);
E. prevention of alteration (invisible and low tolerance);
F. authentication;
G. secret communication
H. embedding of notes or labels about digital contents for the purpose of marking ownership (visible and irreversible); and
I. distribution of contents with capacity to remove watermarking (visible and reversible).

Usage for "E. prevention of alteration" for the purpose of protecting the right of content authors may be as follows.

There is a technology that embeds a watermark into a digital image and generates an electronic signature when a photograph is taken by use of a digital camera, the watermark indicating a serial number of the digital camera and the date and, time of the photograph. Digital watermarking technology is utilized in addition to the electronic signature technology, which generally provides for alteration check. This makes it possible not only to detect alteration that is made to the digital image but also to identify the digital camera used for photographing and the data and time of photographing. Alteration of digital images is thus more effectively prevented (see Non-patent Document 1).

The technology of embedding digital watermarking into digital contents (hereinafter referred to as a digital-water-marking technology) breaks down into two groups- (1) a technology that embeds digital watermarking directly into the sample points of contents data; and (2) a technology that embeds digital watermarking into the frequency components of contents data.

The method of embedding digital watermarking into the sample points of data requires undemanding processing for modifying and compressing of digital contents. When modification or compression is applied to the digital contents with embedded digital watermarking, however, the embedded digital watermarking may easily be destroyed.

On the other hand, the method of embedding a watermark into frequency components requires heavy processing for embedding and extracting the watermark into and from digital contents. This method, however, is robust against modification or compression that is made to the digital contents with embedded digital watermarking.

In black and white printing for monochrome digital copy, monochrome facsimile, monochrome newspaper, etc., a lossless image compression method is recommended and generally used that uses a black/white binary image and reconstructs an original image without any loss. Such a lossless image compression method includes MH, MR, MMR, etc., which are G3 and G4 standards of the International Telecommunications Union (ITU-T).

However, these methods have drawbacks in that coding efficiency is poor for halftone images or error diffused images, and may fail to compress data.

As a measure to obviate this problem, an arithmetic coding system that attends to coding based on image entropy is attracting attention. JBIG, which is a group that examines the international standard of a new coding system for binary images, for example, has adopted an arithmetic coding system referred to as QM-Coder. The QM-Coder arithmetic coding system is recommended as an ITU-T standard.

In products such as digital still/video cameras that handle multi-value images like digital color images or gray-scale images, for example, it is becoming more common to use a lossy compression technology by placing an emphasis on a compression rate for data storage while compromising on image degradation such as the loss of fine information on an original image. Such lossy compression technology includes JPEG, MPEG, etc., which employ frequency transformation based on the discrete cosine transform (DCT).

As a next standard after JPEG, further, JPEG2000 is a focus of a lot of attention as a consolidated coding method for binary data and multi-value data and also as a consolidated coding method for a lossy coding system and a lossless coding system. JPEG2000 uses the discrete wavelet transform (DWT) to reduce the degradation of image quality at the time of high compression rates, and also employs an MQ-Coder to achieve a high compression rate. The MQ-Coder resembles the QM-Coder of JB IG previously described, and is an arithmetic coding method which is employed by JBIG2.

[Non-Patent Document 1]

Investigative-report regarding the digital watermarking technology, March, 1999: Edited by Japan Electronic Industry Development Association (Daigen: Nikkei business: prevention of illegal coping of electronic information, February 23, pp. 68-70 (1998))

When the technology (1) as previously described is used to embed digital watermarking into the digital contents of compressed multi-value images, image quality deteriorates due to a coding process for image compression that is performed at the time of storing digital contents. Together with this image deterioration, the digital watermarking embedded into the digital contents also deteriorates. The larger the number of occurrences at which coding for compression and decoding for decompression are repeated, the weaker the capability becomes to detect digital watermarking embedded into digital contents.

There is thus a need to detect digital watermarking even after repeated coding and decoding processes when the embedding of digital watermarking is aimed at detecting the alteration of digital contents. It is thus reasonable to employ the technology (2) of embedding digital watermarking into code sequence data (frequency components) when compressed digital contents are to be stored.

There is a need for a scheme that allows the position of alteration to be detected on a block-specific basis without the deterioration of digital watermarking even after repeated coding and decoding processes performed on image data.

SUMMARY OF THE INVENTION

It is a general object of the present invention to provide a scheme that substantially obviates one or more problems caused by the limitations and disadvantages of the related art.

It is another and more specific object of the invention to provide a scheme that allows the position of alteration to be detected on a block-specific basis without the deterioration of digital watermarking even after repeated coding and decoding processes performed on image data.

To achieve these and other advantages in accordance with the purpose of the invention, the invention provides an apparatus for generating codes, including a quantization unit which generates quantization coefficients by performing discrete wavelet transform with respect to each of tiles into which an image is divided, a block division unit which divides the quantization coefficients into blocks, a Hash conversion unit which performs Hash conversion based on the quantization coefficients of each of the blocks so as to produce a Hash value for each of the blocks, a digital watermark embedding unit which adjusts a parity of a quantization coefficient of interest equal to a parity of the Hash value of a block to which the quantization coefficient of interest belongs, and a coding unit which generates code sequence data by coding the quantization coefficients including the quantization coefficient whose parity is adjusted.

In this manner, the digital watermarking is embedded into quantization coefficients, so that coding and decoding processes repeated on image data do not deteriorate the embedded digital watermarking. Also, the parity of the quantization coefficients is controlled based on the hash value obtained on a block-specific basis with respect to the quantization coefficients of interest, thereby making it possible to detect the position of tampering on a block-specific basis.

According to another aspect of the invention, the apparatus further includes an information input unit which enters information, wherein the Hash conversion unit performs the Hash conversion based on the entered information in addition to the quantization coefficients.

In this manner, the entered information is used as a seed in addition to the quantization coefficients when performing the Hash conversion. This makes it more difficult for a third party to identify digital watermarking embedded into data.

According to another aspect of the invention, the apparatus further includes a date information acquiring unit which acquires date information, wherein the Hash conversion unit performs the Hash conversion based on the date information in addition to the quantization coefficients.

In this manner, the date information is used as a seed in addition to the quantization coefficients when performing the Hash conversion. This makes it more difficult for a third party to identify digital watermarking embedded into data.

According to another aspect of the invention, the apparatus further includes a serial-number detecting unit which detects a serial number of the apparatus, wherein the Hash conversion unit performs the Hash conversion based on the serial number in addition to the quantization coefficients.

In this manner, the serial-number information is used as a seed in addition to the quantization coefficients when performing the Hash conversion. This makes it more difficult for a third party to identify digital watermarking embedded into data.

According to another aspect of the invention, the apparatus further includes an information input unit which enters information, a date information acquiring unit which acquires date information, and a serial-number detecting unit which detects a serial number of the apparatus, wherein the Hash conversion unit performs the Hash conversion based on at least two of the entered information, the date information, and the serial number in addition to the quantization coefficients.

In this manner, at least two of the entered information, the date information, and the serial-number information are used as a seed in addition to the quantization coefficients when performing the Hash conversion. This makes it more difficult for a third party to identify digital watermarking embedded into data.

According to another aspect of the invention, the apparatus further includes a selecting unit which selects said at least two of the entered information, the date information, and the serial number.

In this manner, information that may be selected by a user is used as a seed in addition to the quantization coefficients when performing the Hash conversion. This makes it more difficult for a third party to identify digital watermarking embedded into data.

According to another aspect of the invention, the digital watermark embedding unit adjusts the parity by either one of a first method and a second method, the first method incrementing the quantization coefficient by +1 if the Hash value of the block is an even number and the quantization coefficient is an odd number, and incrementing the quantization coefficient by −1 if the Hash value of the block is an odd number and the quantization coefficient is an even number, the second method incrementing the quantization coefficient by +1 if the Hash value of the block is an odd number and the quantization coefficient is an even number, and incrementing the quantization coefficient by −1 if the Hash value of the block is an even number and the quantization coefficient is an odd number.

In this manner, the quantization coefficient having digital watermarking embedded therein is never apart by more than +1 or −1 from the original quantization coefficient even if a plurality of digital watermarks are embedded one over another. This suppresses the deterioration of image quality caused by the embedding of digital watermarking.

According to another aspect of the invention, the apparatus further includes a method selecting unit which selects a desired one of the first method and the second method, wherein the digital watermark embedding unit adjusts the parity by the desired one of the first method and the second method selected by the method selecting unit.

In this manner, the first method and the second method can freely be switched.

According to another aspect of the invention, the method selecting unit selects a desired one of the first method and the second method based on the Hash value and coordinates of the quantization coefficient of interest.

In this manner, the selection of either one of the first method and the second method may be made based on the hash value and the coordinates of the quantization coefficient at the position of interest in the image. This makes it more difficult for a third party to identify digital watermarking embedded into data.

According to another aspect of the invention, the method selecting unit selects a desired one of the first method and the second method based on the Hash value and information entered into the apparatus.

In this manner, the selection of either one of the first method and the second method may be made based on the hash value and the entered-information. This makes it more difficult for a third party to identify digital watermarking embedded into data.

According to another aspect of the invention, the block division unit divides the quantization coefficients such that adjacent blocks partially overlap.

This makes it possible to detect the replacement of a whole block as tampering.

According to another aspect of the invention, the block division unit divides the quantization coefficients such that an overlapping area of the adjacent blocks is adjustable.

This makes it possible to adjust the processing load and processing speed of the processes for embedding digital watermarking.

According to another aspect of the invention, the block division unit divides the quantization coefficients such that size of the blocks is adjustable.

This makes it possible to adjust the processing load and processing speed of the processes for embedding digital watermarking.

According to another aspect of the invention, the apparatus further includes a bitplane decomposition unit which decomposes the quantization coefficients into individual bitplanes, wherein the digital watermark embedding unit adjusts the parity by changing an ON/OFF state of a bit on a bitplane-by-bitplane basis.

With this provision, processing is carried out separately for each bitplane. Even if some bitplanes are discarded at a subsequent coding stage, therefore, no harm is done by such discarding of bitplanes.

According to another aspect of the invention, the digital watermark embedding unit adjusts the parity by changing the ON/OFF state of a valid bit.

Here, a "valid" state refers to a state in which the coefficient of interest has already been determined to be non-zero when coding the quantization coefficient of interest in the bit representation from the upper-order bits to the lower-order bits, i.e., a bit having a value "1" has already been encountered for coding.

An "invalid" state, on the other hand, refers to a state in which the coefficient of interest is determined to be 0 or can still be 0 before a bit having a value "1" has not yet been encountered for coding.

In this manner, only valid bits are processed for the matching of parity, thereby making it possible to reduce the deterioration of image quality caused by the embedding of digital watermarking.

According to another aspect of the invention, the coding unit performs coding from higher-order bitplanes to lower-order bitplanes, wherein if an OFF bit is to be changed to an ON bit, all bits in the bitplanes lower than a bitplane of interest are changed to OFF, and wherein if an ON bit is to be changed to an OFF bit, all bits in the bitplanes lower than the bitplane of interest are changed to ON.

In this manner, an ON/OFF change is evenly made when coding the bits from higher-order bitplanes to lower-order bitplanes, thereby suppressing the degradation of image quality caused by the embedding of digital watermarking.

According to another aspect of the invention, the apparatus further includes a quantization coefficient selecting unit which selectively picks the quantization coefficient of interest.

In this manner, digital watermarking is selectively embedded into quantization coefficients. Compared with the case where digital watermarking is embedded into all the quantization coefficients, the degradation of image quality caused by the embedding of digital watermarking is reduced.

According to another aspect of the invention, the quantization coefficient selecting unit picks a quantization coefficient that is different from an adjacent quantization coefficient more than a predetermined difference.

In this manner, valid bits are changed as to its ON/OFF state if a difference with the adjacent quantization coefficient is larger than the predetermined difference, i.e., if a change relative to the adjacent quantization coefficient is abrupt. This suppresses the degradation of image quality caused by the embedding of digital watermarking.

According to another aspect of the invention, frequency of picking by the quantization coefficient selecting unit is adjustable.

In this manner, quantization coefficients are selected at the frequency of selection that is adjustable according to desired image quality, for example. This makes it possible to control the degradation of image quality caused by the embedding of digital watermarking.

According to another aspect of the invention, the apparatus further includes an image inputting unit which acquires an image by optically scanning a target image, wherein the quantization unit quantizes the image acquired by the image inputting unit.

In this manner, digital watermarking may be embedded into images obtained by a digital camera, a scanner, or the like.

According to the invention, an image processing apparatus includes a decoding unit which generates quantization coefficients by decoding code sequence data, a block division unit which divides the quantization coefficients into blocks, a Hash conversion unit which performs Hash conversion based on the quantization coefficients of each of the blocks so as to produce a Hash value for each of the blocks, and a tampering detecting unit which detects presence/absence of tampering by checking whether a parity of a quantization coefficient of interest is equal to a parity of the Hash value of a block to which the quantization coefficient of interest belongs.

In this manner, the presence/absence of tampering of code sequence data can be detected on a block-by-block basis.

According to another aspect of the invention, the image processing apparatus further includes an image generating unit which generates image data by performing discrete wavelet transform with respect to the quantization coefficients, a tampering position registering unit which stores a position of a block where tampering is detected, and a highlight presentation unit which shows an image of the image data with the stored position of the block being highlighted.

Here, the highlight presentation unit may present an image of the registered block in a monochrome color or by reversed coloring. This allows visual identification to be made with respect to the tampered position on a block-by-block basis.

According to the invention, a computer-readable medium has a program embodied therein for causing a computer to generate codes. The program includes a quantization unit which generates quantization coefficients by performing discrete wavelet transform with respect to each of tiles into which an image is divided, a block division unit which divides the quantization coefficients into blocks, a Hash conversion unit which performs Hash conversion based on the quantization coefficients of each of the blocks so as to produce a Hash value for each of the blocks, a digital watermark embedding unit which adjusts a parity of a quantization coefficient of interest equal to a parity of the Hash value of a block to which the quantization coefficient of interest belongs, and a coding unit which generates code sequence data by coding the quantization coefficients including the quantization coefficient whose parity is adjusted.

In this manner, the digital watermarking is embedded into quantization coefficients, so that coding and decoding processes repeated on image data do not deteriorate the embedded digital watermarking. Also, the parity of the quantization coefficients is controlled based on the hash value obtained on a block-specific basis with respect to the quantization coefficients of interest, thereby making it possible to detect the position of tampering on a block-specific basis.

According to another aspect of the invention, the Hash conversion unit performs the Hash conversion based on information entered from an exterior of the computer in addition to the quantization coefficients.

In this manner, the entered information is used as a seed in addition to the quantization coefficients when performing the Hash conversion. This makes it more difficult for a third party to identify digital watermarking embedded into data.

According to another aspect of the invention, the Hash conversion unit performs the Hash conversion based on date information in addition to the quantization coefficients.

In this manner, the date information is used as a seed in addition to the quantization coefficients when performing the Hash conversion. This makes it more difficult for a third party to identify digital watermarking embedded into data.

According to another aspect of the invention, the Hash conversion unit performs the Hash conversion based on a device serial number in addition to the quantization coefficients.

In this manner, the serial-number information is used as a seed in addition to the quantization coefficients when performing the Hash conversion. This makes it more difficult for a third party to identify digital watermarking embedded into data.

According to another aspect of the invention, the Hash conversion unit performs the Hash conversion based on at least two of information entered from an exterior, date information, and a device serial number in addition to the quantization coefficients.

In this manner, at least two of the entered information, the date information, and the serial-number information are used as a seed in addition to the quantization coefficients when performing the Hash conversion. This makes it more difficult for a third party to identify digital watermarking embedded into data.

According to another aspect of the invention, the program further includes a selecting unit which selects said at least two of the entered information, the date information, and the serial number.

In this manner, information that may be selected by a user is used as a seed in addition to the quantization coefficients when performing the Hash conversion. This makes it more difficult for a third party to identify digital watermarking embedded into data.

According to another aspect of the invention, the digital watermark embedding unit adjusts the parity by either one of a first method and a second method, the first method incrementing the quantization coefficient by +1 if the Hash value of the block is an even number and the quantization coefficient is an odd number, and incrementing the quantization coefficient by −1 if the Hash value of the block is an odd number and the quantization coefficient is an even number, the second method incrementing the quantization coefficient by +1 if the Hash value of the block is an odd number and the quantization coefficient is an even number, and incrementing the quantization coefficient by −1 if the Hash value of the block is an even number and the quantization coefficient is an odd number.

In this manner, the quantization coefficient having digital watermarking embedded therein is never apart by more than +1 or −1 from the original quantization coefficient even if a plurality of digital watermarks are embedded one over another. This suppresses the deterioration of image quality caused by the embedding of digital watermarking.

According to another aspect of the invention, the program further includes a method selecting unit which selects a desired one of the first method and the second method, wherein the digital watermark embedding unit adjusts the parity by the desired one of the first method and the second method selected by the method selecting unit.

In this manner, the first method and the second method can freely be switched.

According to another aspect of the invention, the method selecting unit selects a desired one of the first method and the second method based on the Hash value and coordinates of the quantization coefficient of interest.

In this manner, the selection of either one of the first method and the second method may be made based on the hash value and the coordinates of the quantization coefficient at the position of interest in the image. This makes it more difficult for a third party to identify digital watermarking embedded into data.

According to another aspect of the invention, the method selecting unit selects a desired one of the first method and the second method based on the Hash value and information entered from an exterior.

In this manner, the selection of either one of the first method and the second method may be made based on the hash value and the entered information. This makes it more difficult for a third party to identify digital watermarking embedded into data.

According to another aspect of the invention, the block division unit divides the quantization coefficients such that adjacent blocks partially overlap.

This makes it possible to detect the replacement of a whole block as tampering.

According to another aspect of the invention, the block division unit divides the quantization coefficients such that an overlapping area of the adjacent blocks is adjustable.

This makes it possible to adjust the processing load and processing speed of the processes for embedding digital watermarking.

According to another aspect of the invention, the block division unit divides the quantization coefficients such that size of the blocks is adjustable.

This makes it possible to adjust the processing load and processing speed of the processes for embedding digital watermarking.

According to another aspect of the invention, the program further includes a bitplane decomposition unit which decomposes the quantization coefficients into individual bitplanes, wherein the digital watermark embedding unit adjusts the parity by changing an ON/OFF state of a bit on a bitplane-by-bitplane basis.

With this provision, processing is carried out separately for each bitplane. Even if some bitplanes are discarded at a subsequent coding stage, therefore, no harm is done by such discarding of bitplanes.

According to another aspect of the invention, the digital watermark embedding unit adjusts the parity by changing the ON/OFF state of a valid bit.

Here, a "valid" state refers to a state in which the coefficient of interest has already been determined to be non-zero when coding the quantization coefficient of interest in the bit representation from the upper-order bits to the lower-order bits, i.e., a bit having a value "1" has already been encountered for coding.

An "invalid" state, on the other hand, refers to a state in which the coefficient of interest is determined to be 0 or can still be 0 before a bit having a value "1" has not yet been encountered for coding.

In this manner, only valid bits are processed for the matching of parity, thereby making it possible to reduce the deterioration of image quality caused by the embedding of digital watermarking.

According to another aspect of the invention, the coding unit performs coding from higher-order bitplanes to lower-order bitplanes, wherein if an OFF bit is to be changed to an ON bit, all bits in the bitplanes lower than a bitplane of interest are changed to OFF, and wherein if an ON bit is to be changed to an OFF bit, all bits in the bitplanes lower than the bitplane of interest are changed to ON.

In this manner, an ON/OFF change is evenly made when coding the bits from higher-order bitplanes to lower-order bitplanes, thereby suppressing the degradation of image quality caused by the embedding of digital watermarking.

According to another aspect of the invention, the program further includes a quantization coefficient selecting unit which selectively picks the quantization coefficient of interest.

In this manner, digital watermarking is selectively embedded into quantization coefficients. Compared with the case where digital watermarking is embedded into all the quantization coefficients, the degradation of image quality caused by the embedding of digital watermarking is reduced.

According to another aspect of the invention, the quantization coefficient selecting unit picks a quantization coefficient that is different from an adjacent quantization coefficient more than a predetermined difference.

In this manner, valid bits are changed as to its ON/OFF state if a difference with the adjacent quantization coefficient is larger than the predetermined difference, i.e., if a change relative to the adjacent quantization coefficient is abrupt. This suppresses the degradation of image quality caused by the embedding of digital watermarking.

According to another aspect of the invention, frequency of picking by the quantization coefficient selecting unit is adjustable.

In this manner, quantization coefficients are selected at the frequency of selection that is adjustable according to desired image quality, for example. This makes it possible to control the degradation of image quality caused by the embedding of digital watermarking.

According to the invention, a computer-readable medium has a program embodied therein for causing a computer to process images. The program includes a decoding unit which generates quantization coefficients by decoding code sequence data, a block division unit which divides the quantization coefficients into blocks, a Hash conversion unit which performs Hash conversion based on the quantization coefficients of each of the blocks so as to produce a Hash value for each of the blocks, and a tampering detecting unit which detects presence/absence of tampering by checking whether a parity of a quantization coefficient of interest is equal to a parity of the Hash value of a block to which the quantization coefficient of interest belongs.

In this manner, the presence/absence of tampering of code sequence data can be detected on a block-by-block basis.

According to another aspect of the invention, the program further includes an image generating unit which generates image data by performing discrete wavelet transform with respect to the quantization coefficients, and a highlight presentation unit which shows an image of the image data with a block position being highlighted, the block position being a position where tampering is detected.

Here, the highlight presentation unit may present an image of the registered block in a monochrome color or by reversed coloring. This allows visual identification to be made with respect to the tampered position on a block-by-block basis.

According to the invention, a computer program for causing a computer to generate codes includes a quantization unit which generates quantization coefficients by performing discrete wavelet transform with respect to each of tiles into which an image is divided, a block division unit which divides the quantization coefficients into blocks, a Hash conversion unit which performs Hash conversion based on the quantization coefficients of each of the blocks so as to produce a Hash value for each of the blocks, a digital watermark embedding unit which adjusts a parity of a quantization coefficient of interest equal to a parity of the Hash value of a block to which the quantization coefficient of interest belongs, and a coding unit which generates code sequence data by coding the quantization coefficients including the quantization coefficient whose parity is adjusted.

According to the invention, a computer program for causing a computer to process images includes a decoding unit which generates quantization coefficients by decoding code sequence data, a block division unit which divides the quantization coefficients into blocks, a Hash conversion unit which performs Hash conversion based on the quantization coefficients of each of the blocks so as to produce a Hash value for each of the blocks, and a tampering detecting unit which detects presence/absence of tampering by checking whether a parity of a quantization coefficient of interest is equal to a parity of the Hash value of a block to which the quantization coefficient of interest belongs.

Other objects and further features of the present invention will be apparent from the following detailed description when read in conjunction with the accompanying drawings.

BRIEF DESCRIPTION OF THE DRAWINGS

FIGS. 5A through 5E are illustrative drawings for explaining a procedure for ordering bitplanes;

FIG. 7 is a flowchart showing an operation performed by the image management apparatus at the time of embedding digital watermarking;

FIGS. 9A and 9B are illustrative drawings showing quantization coefficients;

FIG. 10 is a flowchart showing an operation that is performed by the image management apparatus when detecting tampering of code sequence data into which digital watermarking is embedded;

FIG. 11 is a flowchart showing an operation that is performed by the image management apparatus when embedding digital watermarking; and FIG. 12 is a flowchart showing a process performed by an image-processing apparatus when tampering is to be detected in code sequence data with embedded digital watermarking.

DESCRIPTION OF THE PREFERRED EMBODIMENTS

In the following, embodiments of the present invention will be described with reference to the accompanying drawings.

In the following, the outline of JPEG2000 algorithm, which forms a basis for embodiments of the invention, will be described first.

Figure 1:
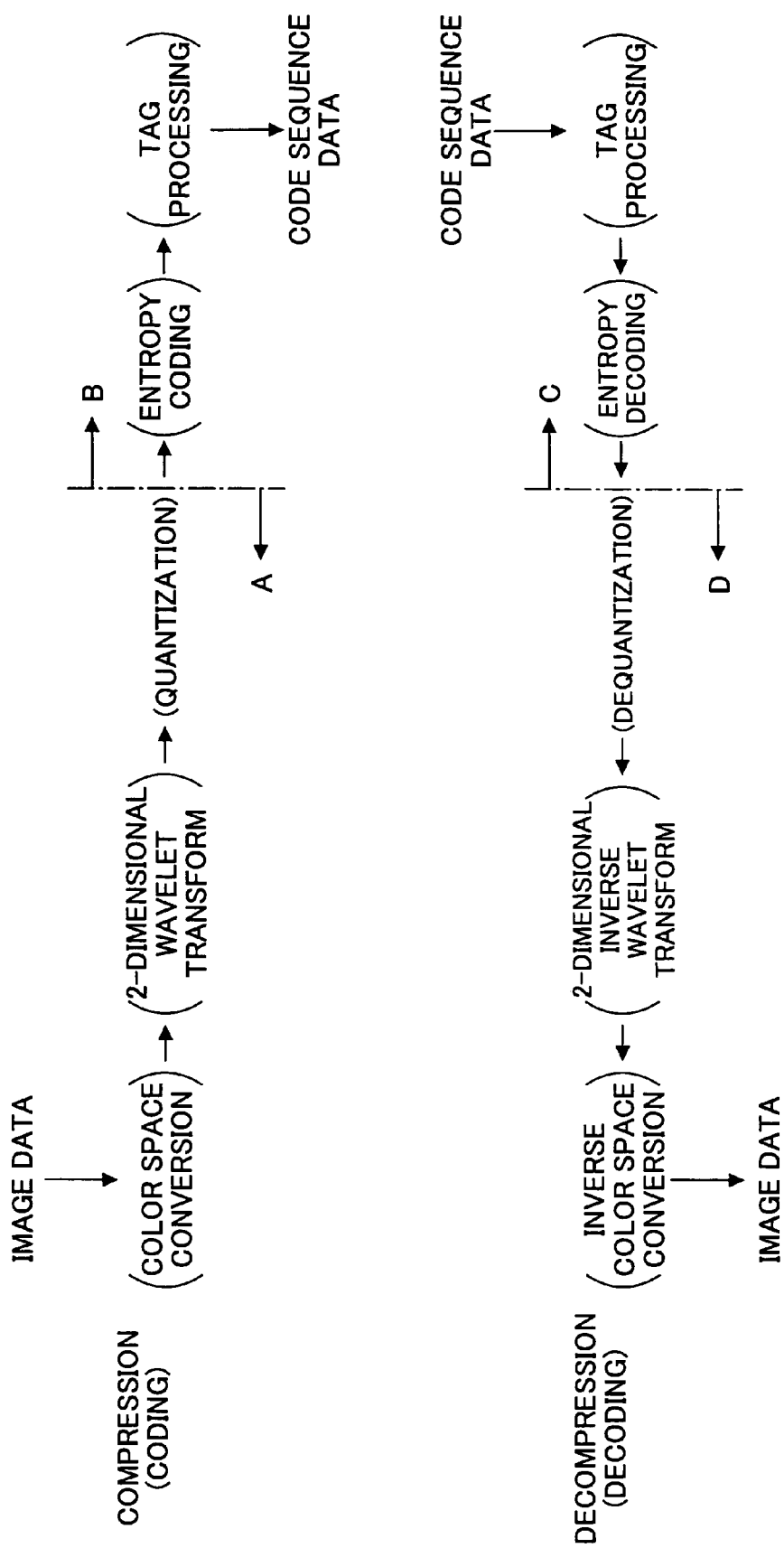
FIG. 1 is a diagram for explaining a hierarchical coding and decoding algorithm that is a foundation of the JPEG2000 system.

FIG. 1 is a diagram for explaining a hierarchical coding and decoding algorithm that is a foundation of the JPEG2000 system. According to the hierarchical coding algorithm of the JPEG2000 system (hereinafter referred to as a JPEG2000 algorithm) as shown in FIG. 1, digital image data is compressed to generate code sequence data (coding), and code sequence data is decompressed to generate image data (decoding).

The point at which the JPEG2000 algorithm most differs from the conventional JPEG algorithm is the method of transform. While the JPEG algorithm uses the discrete cosine transform (DCT), the hierarchical coding algorithm of the JPEG2000 system employs discrete wavelet transform (DWT). DWT has an advantage over DCT in that image quality is high when compression rates are high. This is one of the reasons why DWT was adopted by JPEG2000, which is a successor algorithm to JPEG.

Another significant difference between the JPEG2000 algorithm and the JPEG algorithm is that the JPEG2000 algorithm performs code generation at the last stage of the system. Because of this, additional functions are provided to generate compressed data as code sequence data at the time of image compression and to interpret code sequence data necessary for decompression at the time of decompression.

JPEG2000 is configured to provide various convenient functions through code sequence data. For example, the compression and decompression process of a still image can freely be suspended at any one of decomposition levels, which correspond to the octave division of the block-based DWT. Moreover, JPEG2000 allows a low-resolution image (size-reduced image) to be taken out of a file, and allows a portion of the image (tiling image) to be taken out of the file.

With respect to the input/output image data of an original image, the RGB color system comprised of R(red), G(green), and B(blue) components that are primary colors or the YMC color system comprised of Y(yellow), M(magenta), and C(cyan) components that form a complement color system is converted into or inverse-converted from the YCbCr or YUV color system.

Figure 2:
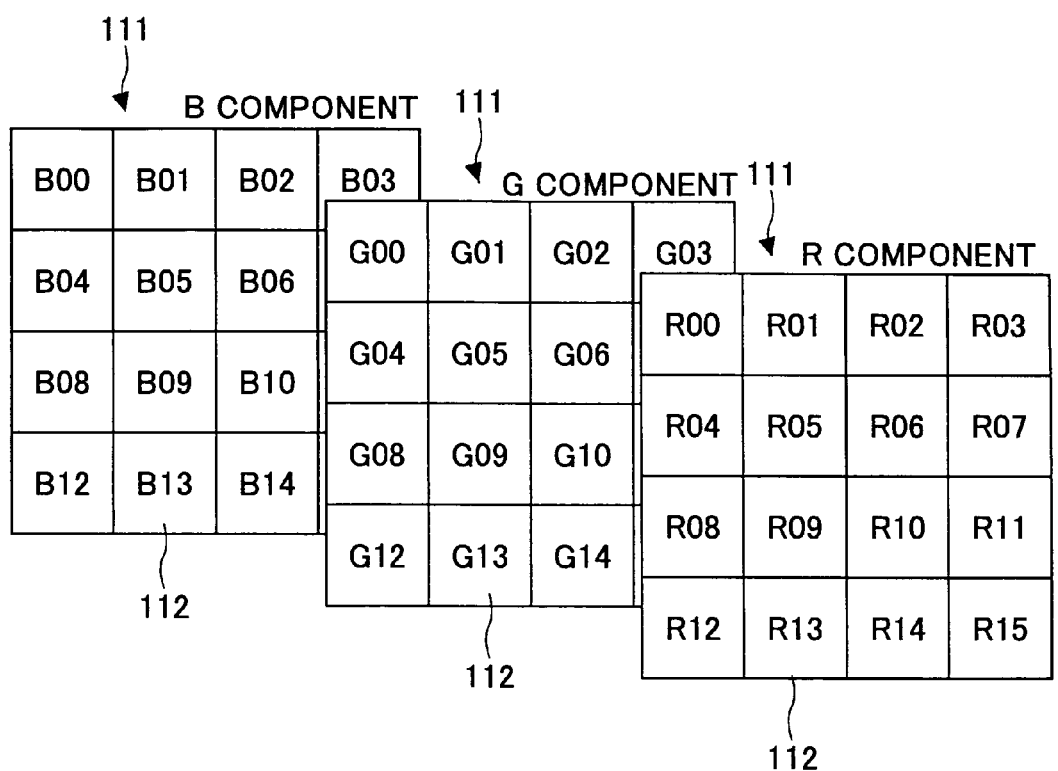
FIG. 2 is an illustrative drawing showing a color image that is divided into rectangular areas with respect to each color component.
Figure 3A:
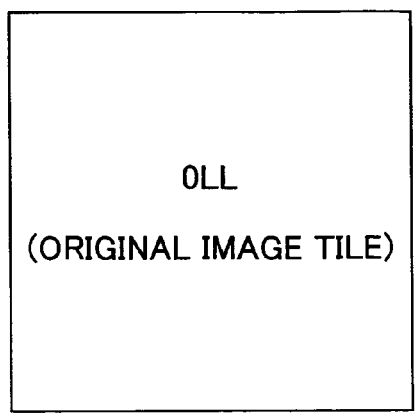
FIGS. 3A through 3D are drawings showing sub-bands in each decomposition level in the case where the number of the decomposition levels is 3.
Figure 3B:
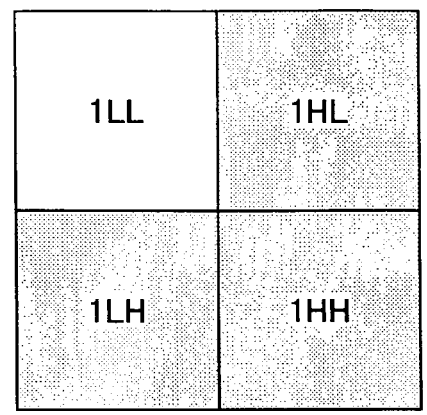
Figure 3C:
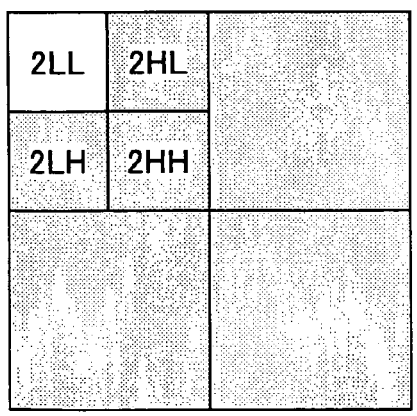
Figure 3D:
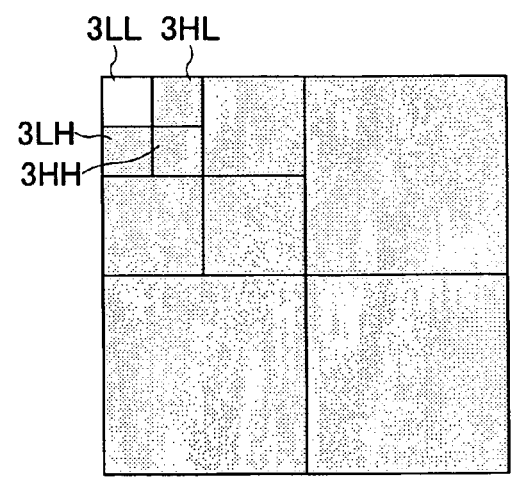

In general, a color image is divided into rectangular areas with respect to each component of an original image, as shown in FIG. 2. These rectangular areas are generally referred to as blocks or tiles. Since they are generally referred to as tiles in JPEG2000, these divided rectangular areas are hereinafter called tiles.

When the compression and decompression process of image data is performed according to the JPEG2000 algorithm, individual tiles serve as a basic unit, and compression/decompression is carried out separately for each component on a tile-by-tile basis.

In what follows, the coding of image data according to the JPEG2000 algorithm will be described. In the coding of image data according to the JPEG2000 algorithm, as shown in FIG. 1, color space conversion is performed with respect to each tile of each component, and, then, 2-dimensional wavelet transform (forward conversion) is performed to divide the space into frequency bands.

FIGS. 3A through 3D are drawings showing sub-bands in each decomposition level in the case where the number of the decomposition levels is 3. Where the number of the decomposition levels (the number of wavelet transforms performed) is 3, an original tile image (0LL) (decomposition level 0) that is obtained by the tile division of an original image is subjected to the 2-dimensional wavelet transform, thereby separating sub-bands (1LL, 1HL, 1LH, 1HH) shown at the decomposition level 1. Following this, the low frequency components 1LL at this hierarchical level is subjected to the 2-dimensional wavelet transform, thereby separating sub-bands (2LL, 2HL, 2LH, 2HH) shown at the decomposition level 2. Subsequently, the 2-dimensional wavelet transform is again performed with respect to the low frequency components 2LL, thereby separating sub-bands (3LL, 3HL, 3LH, 3HH) shown at the decomposition level 3. In FIGS. 3A through 3D, the sub bands that are to be coded at each decomposition level are illustrated in the gray halftone. When the decomposition level is 3, for example, the sub bands (3HL, 3LH, 3HH, 2HL, 2LH, 2HH, 1HL, 1LH, 1HH) shown in the gray halftone are subjected to a coding process, and the sub-band 3LL is excluded from the coding process.

Figure 4:
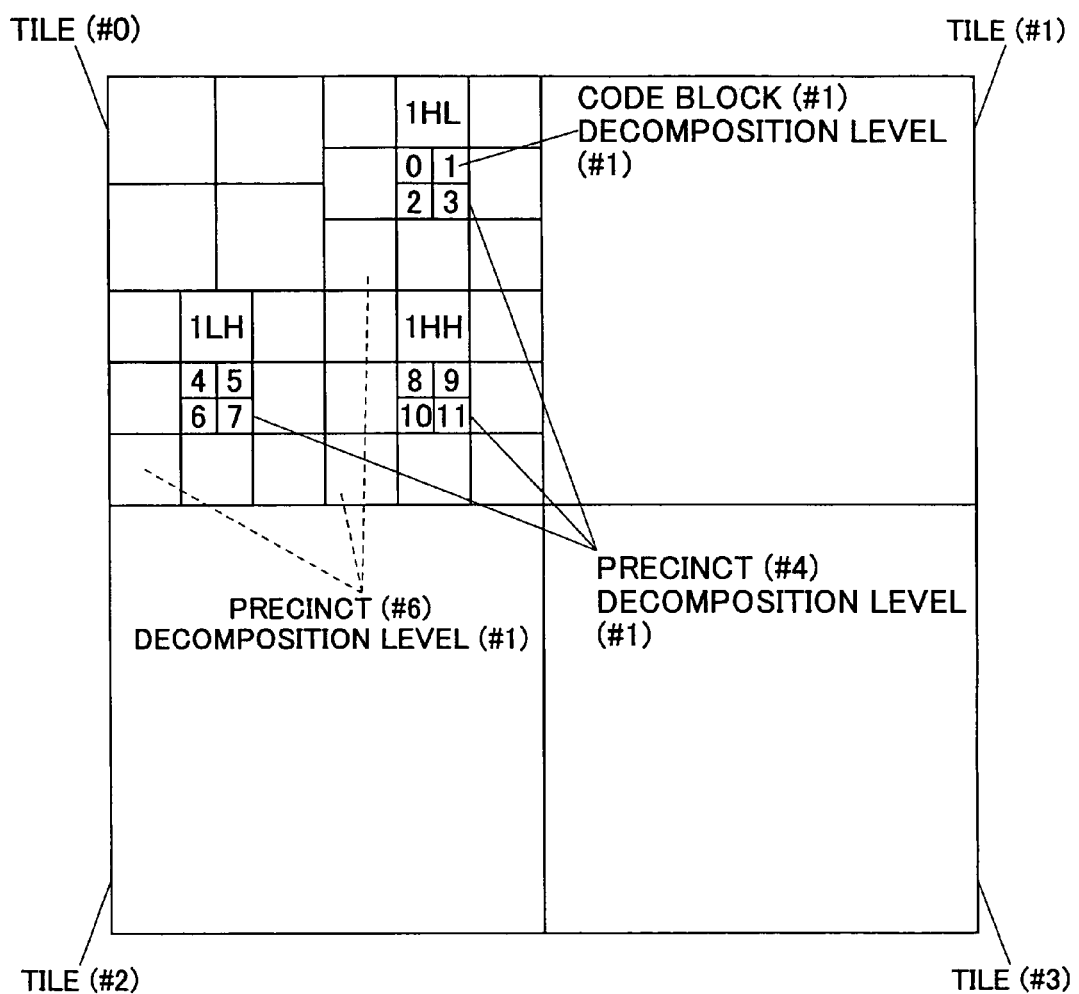
FIG. 4 is an illustrative drawing for explaining precincts.

In predetermined order for coding, bits to be coded are selected, and contexts are generated from surrounding bits that are located around the selected bit (quantization). Wavelet coefficients for which quantization is finished are then divided into non-overlapping rectangles separately for each sub-band. These rectangles are referred to as "precinct". This provision is made in order to make efficient use of memories at the time of implementation. As shown in FIG. 4, one precinct is comprised of three rectangular areas that have matching positional arrangement.

Each precinct is divided into code blocks, which are non-overlapping rectangular areas. The code block serves as a basic unit for performing entropy coding.

Coefficients of the wavelet transform can be directly quantized and coded. In order to improve coding efficiency, however, JPEG2000 allows these coefficients to be divided on a bitplane-by-bitplane basis, and allows the individual bitplanes to be ordered with respect to each pixel or each code block.

Figure 5A:
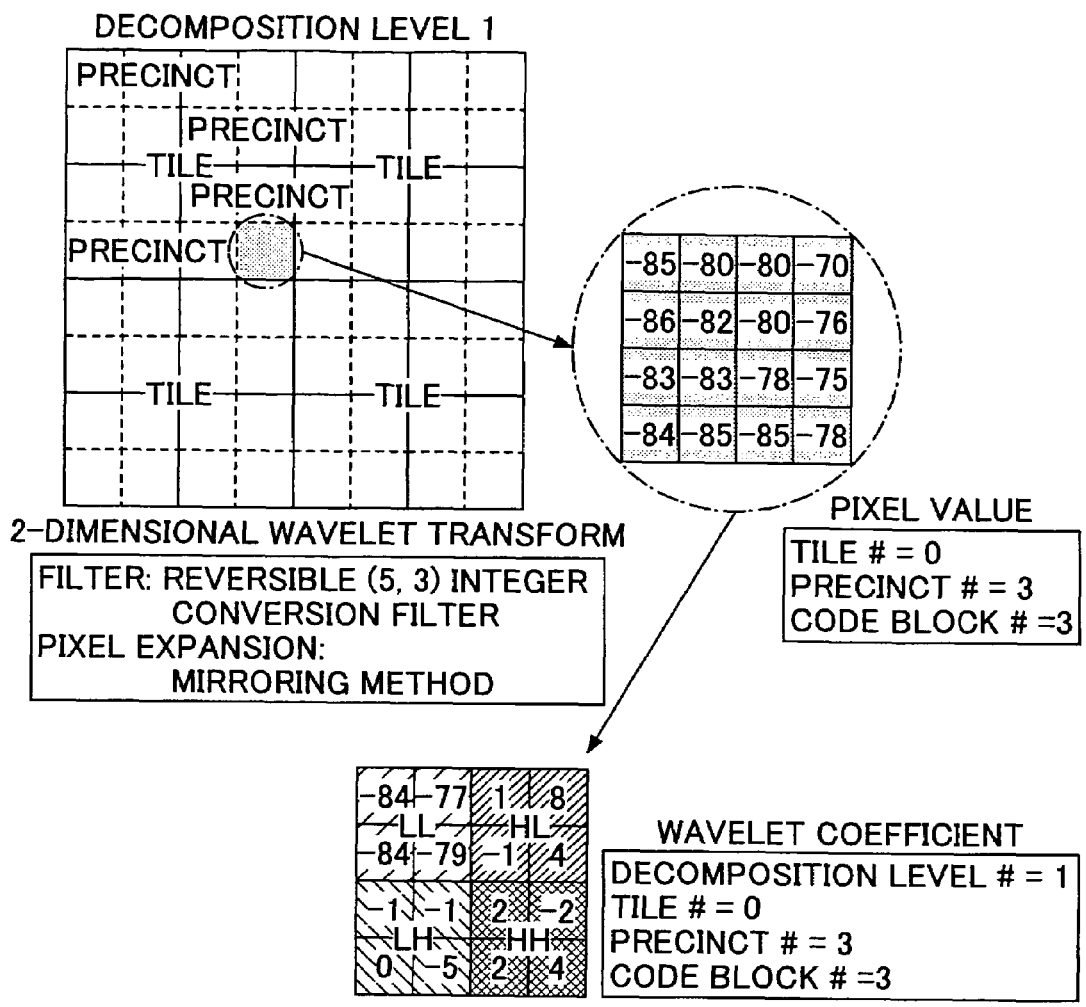
Figures 5B, 5C, 5D, 5E:
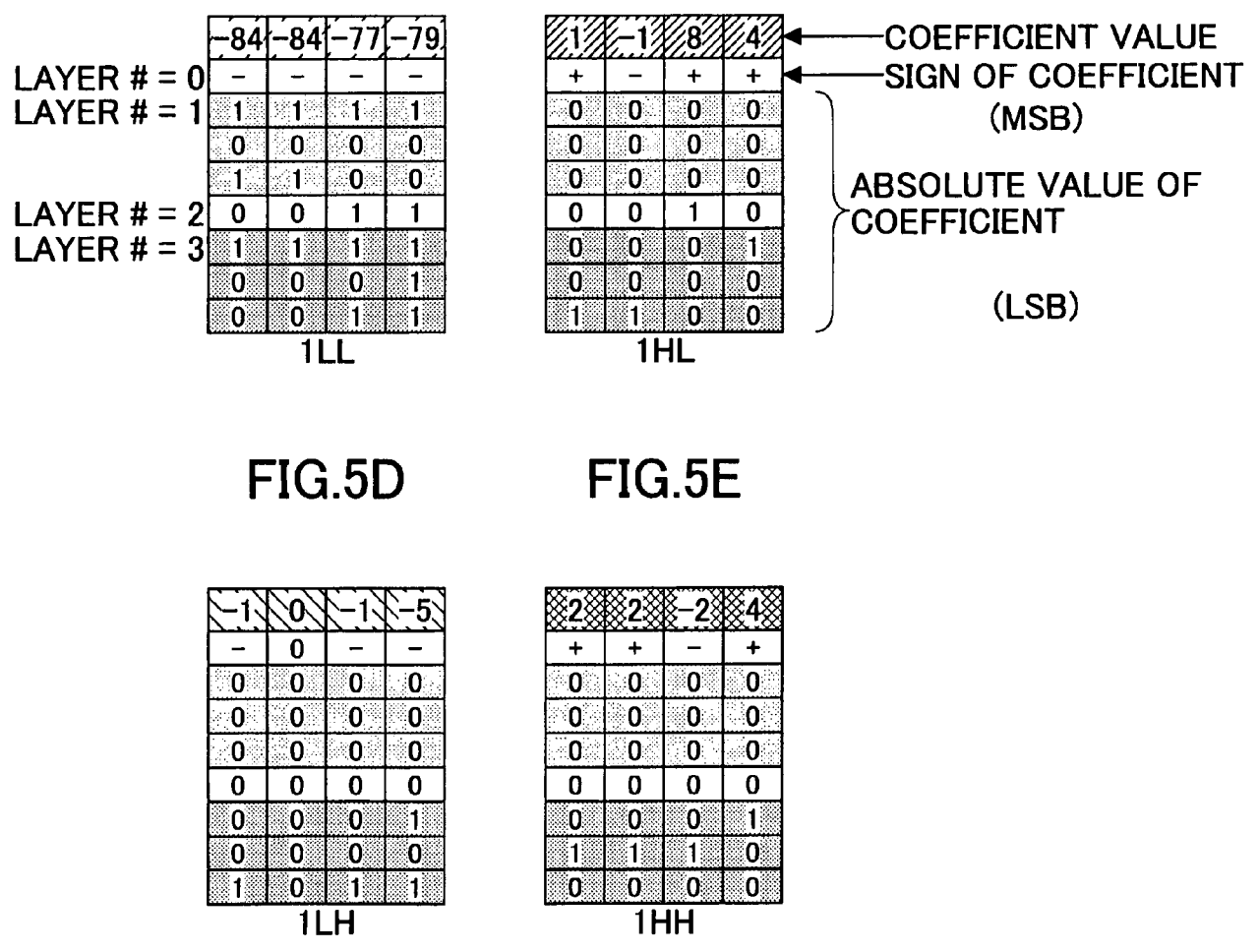

FIGS. 5A through 5E are illustrative drawings for explaining a procedure for ordering bitplanes. As shown in FIG. 5A, this example is directed to a case in which an original image (32×32 pixels) is divided into four tiles each comprised of 16×16 pixels. The size of a precinct and the size of a code block at the decomposition level 1 are 8×8 pixels and 4×4 pixels, respectively. The sequence numbers of precincts and code blocks are given in a raster order. In this example, precincts are given sequence numbers 0 to 3, and code blocks are given sequence numbers 0 to 3. The mirroring method is used for pixel extension outside the tile boundaries. A reversible (5, 3) filter is used for the wavelet transform, thereby generating wavelet coefficients of the decomposition level 1.

An example of a typical layer structure in the case of tile 0/precinct 3/code block 3 is also shown in FIG. 5A through 5E. A code block after transform is divided into sub-bands (1LL, 1HL, 1LH, 1HH), and each sub-band is provided with wavelet coefficients.

The layer structure would be easier to understand if the wavelet coefficients are viewed in a traverse direction (i.e., bitplane direction). A single layer is comprised of a desired number of bitplanes. In this example, layers 0, 1, 2, and 3 are comprised of bitplanes 1, 3, 1, and 3, respectively. The closer the bitplane of a layer to the LSB (least significant bit: the lowest-order bit), the earlier the layer is quantized. Layers closer to the MSB (most significant bit: the highest-order bit) remain until all the other layers are qunatized. A method that disposes of layers closer to the LSB first is referred to as truncation, which provides for the diligent control of quantization rates.

Then, coding of each component tile is performed by use of likelihood estimation based on the contexts and the current bit. In this manner, coding in the unit of a tile is carried out with respect to all the components of an original image.

Finally, all the code sequences of data are consolidated into a single code sequence of data, and tags are attached to it.

In the following, decoding of image data according to the JPEG2000 algorithm will be described. In the decoding, of code sequence data, image data is generated from the code sequence data representing each tile of each component in a reverse order to the coding of image data. In detail, tag information that is attached to the code sequence data provided from an exterior is analyzed, and the code sequence data is disassembled into code sequence data corresponding to each tile of each component, followed by decoding (decompressing) the code sequence data of each tile of each component. For this procedure, a bit position is determined for decoding in the order that is defined by the tag information included in the code sequence data. Further, a context is generated from surrounding bits (those which have already been decoded) around the determined bit position. Decoding is then performed by likelihood estimation based on the context and the code sequence data, thereby producing a current bit, which is then written at the determined bit position.

The decoded data is obtained as image data that is spatially divided for individual frequency bands. The 2-dimensional inverse wavelet transform is applied to this image data to reconstruct each tile of each component of the image data. Inverse color space conversion is then performed with respect to the reconstructed data so as to obtain image data of an original colorimetric system.

What has been described above is the outline of the JPEG2000 algorithm.

In the process of coding image data, a reversible or irreversible conversion can be performed until the quantization of wavelet coefficients obtained by applying the wavelet transform to input image data. A reversible process such as entropy coding is then applied for generating code sequence data from the quantized wavelet coefficients. In the process of decoding image data, a reversible conversion takes place until the decoding of wavelet coefficient data from input code sequence data (i.e., compressed and stored data) or until the decoding of quantized coefficient data (no quantization is performed in the case of reversible compression). A reversible or irreversible conversion can then be performed when generating image data from the decoded wavelet coefficient data.

In the following, a first embodiment of the invention will be described with reference to FIG. 6 through FIG. 10. In the invention, the quantization coefficients of the JPEG2000 algorithm described above are utilized, thereby embedding digital watermarking into the quantization coefficients within the framework of the JPEG2000 compression process. An example of application of the invention will be described with reference to a code generating apparatus and an image management apparatus serving as an image-processing apparatus, which detect the presence/absence of unauthorized use of images by checking the quantization coefficients with embedded digital watermarking.

Figure 6:
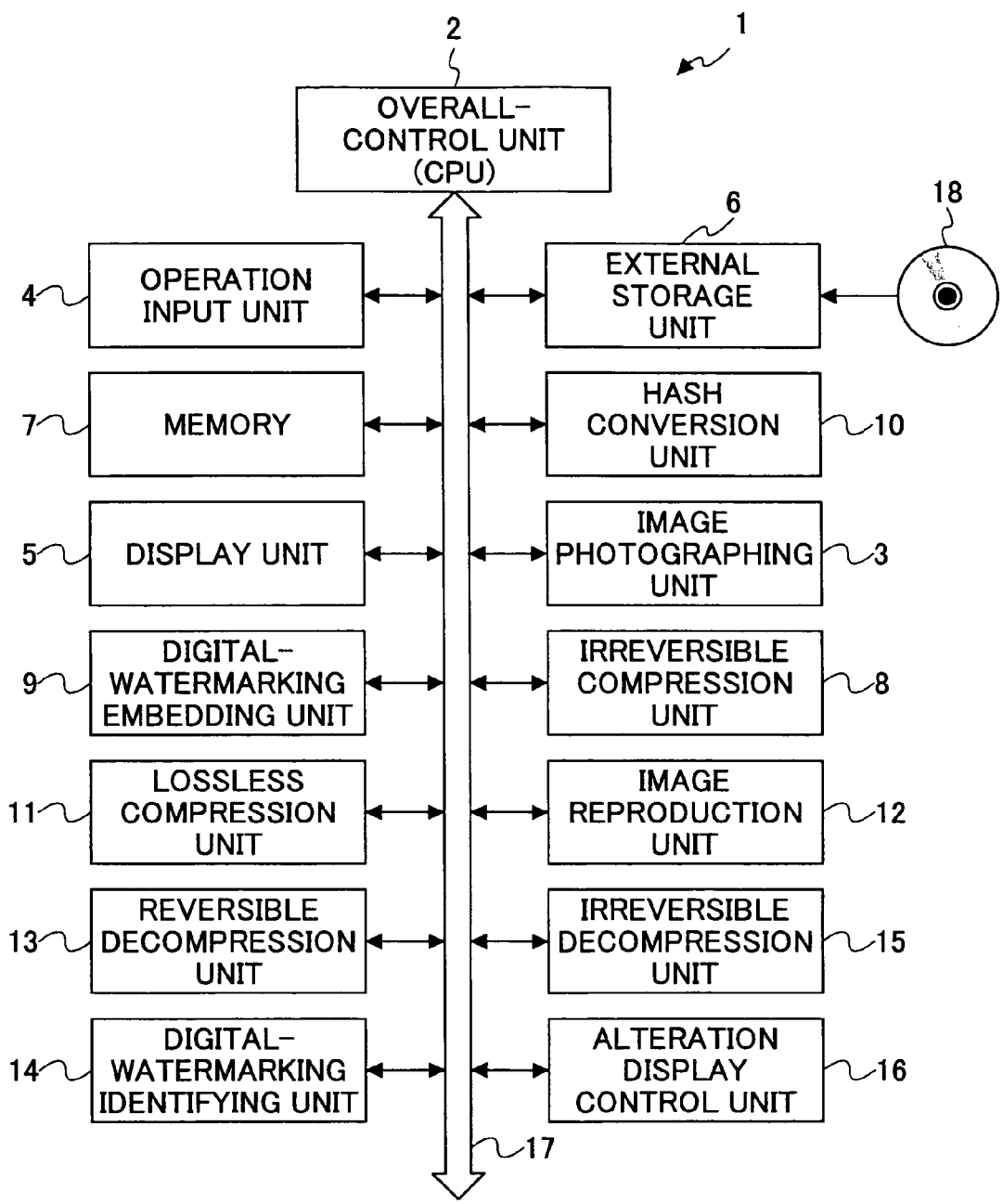
FIG. 6 is a block diagram for explaining the construction of an image management apparatus according to an embodiment of the invention.

FIG. 6 is a block diagram for explaining the construction of the image management apparatus according to this embodiment. In FIG. 6, hardware construction and software functions implemented by a microcomputer are mixed in illustration.

The image management apparatus 1 of this embodiment includes a overall-control unit 2, an image photographing unit 3, an operation input unit 4, a display unit 5, an external storage unit 6, a memory 7, an irreversible compression unit 8, a digital-watermarking embedding unit 9, a Hash conversion unit 10, a lossless compression unit 11, an image reproduction unit 12, a reversible decompression unit 13, a digital-watermarking identifying unit 14, an irreversible decompression unit 15, an alteration display control unit 16, and a bus line 17 that connects between these units.

The overall-control unit 2 is implemented mainly by a microcomputer, which controls the overall operation and functions of the image management apparatus 1. The microcomputer is comprised of a CPU for controlling each unit of the image management apparatus 1, a ROM for storing various control programs for execution by the CPU, and a RAM for storing data in a rewritable manner and providing a work area for the CPU. In general, the microcomputer may simply be referred to as "CPU" by using the CPU as a representative. The microcomputer (CPU) is provided with a timekeeping function. When a digital watermark is embedded, information indicative of the date and time is obtained by use of the timekeeping function. This function serves as a date and time acquiring means.

The ROM stores various control programs for execution by the overall-control unit 2. The overall-control unit 2 performs these control programs, thereby providing for respective functions to be performed by the image photographing unit 3, the operation input unit 4, the display unit 5, the external storage 6, the memory 7, the irreversible compression unit 8, the digital-watermarking embedding unit 9, the Hash conversion unit 10, the lossless compression unit 11, the image reproduction unit 12, the reversible decompression unit 13, the digital-watermarking identifying unit 14, the irreversible decompression unit 15, and the alteration display control unit 16.

The image photographing unit 3 acquires image data by scanning a photograph, a form, etc., placed at a scan position, serving as an image inputting means. As is well known, the image photographing unit 3 may be implemented by a digital camera, an image scanner, or the like, including a scan optical system, an image sensor such as a CCD, and a drive circuit.

The operation input unit 4 serves as an interface between the apparatus and an operator, and is operated by the operator to send various input signals to the overall-control unit 2. Responsive to the signals from the operation input unit 4, the overall-control unit 2 issues various operation instructions and function selecting instructions, and receives edit data or the like. As is well known, the operation input unit 4 may be comprised of a keyboard, a mouse or a touch panel, etc. In this embodiment, operating the operation input unit 4 may prompt the start of randomizing image data that has the embedded digital watermarking data, and may allow necessary information to be entered for identifying the digital watermarking that is embedded into the randomized image data.

The display unit 5 presents images based on the image data acquired by the image photographing unit 3, and also presents operation guides, etc. The display unit 5 of this embodiment is provided with input terminals for R (Red), G (Green), and B (Blue), which may be arranged on the display surface. Signals input into the input terminals can be adjusted to change the brightness of each color. This makes it possible to present a gray tone between a white color corresponding to the brightest inputs into the RGB input terminals and a black color corresponding to the darkest inputs into the RGB input terminals. The setting of presentation on the display unit 5 can be modified into operator-desired presentation by operating the operation input unit 4. The setting of presentation on the display unit 5, for example, may allow the identification of a digital watermark to be shown as superimposed on an input image, or may show either one of these in a selective manner.

The external storage unit 6 stores image data acquired by the image photographing unit 3 and various programs for execution by the overall-control unit 2 in a record medium 18 such as a CD-ROM that is exchangeable, and also reads programs from the record medium 18. The external storage unit 6 also stores, in the record medium 18, data compressed by the lossless compression unit 11 and having digital watermarking embedded by the digital-watermarking embedding unit 9, as well as the data of image portions identified as being tampered by the digital-watermarking identifying unit 14.

The external storage unit 6 of this embodiment can read a code generating program or image-processing program stored in the record medium 18 that is exchangeable. Execution of the code generating program and the image-processing program provides for embedding digital watermarking and detecting digital watermarking, as will be later described. In this manner, this embodiment employs the exchangeable record medium 18 as a record medium having programs embodied therein.

Although the exchangeable record medium 18 has been described as a CD-ROM or the like in this embodiment, the record medium of the invention is not limited to such an embodiment. For example, the record medium may be a flexible disk (FD) or an optical magnetic disk (OMD) that is exchangeable and stores a code generating program and an image-processing program. The code generating program and image-processing program stored in the exchangeable record medium 18 are read by the external storage unit 6 for storage in the RAM. The overall-control unit 2 executes the code generating program and image-processing program stored in the RAM, thereby embedding and detecting digital watermarking. In this manner, the RAM in which the code generating program and image-processing program are installed may also serve as a record medium having programs embodied therein.

Moreover, the code generating program and image-processing program are not limited to those stored in an exchangeable medium (or a RAM), and may as well be downloaded through the Internet or the like from a remote apparatus different from the image management apparatus 1.

The memory 7 is a large-capacity memory, which stores image data acquired by the image photographing unit 3 and various data generated by the JPEG2000 algorithm shown in FIG. 1. The memory 7 may be implemented by use of a RAM or a hard disk. Data generated by the JPEG2000 algorithm shown in FIG. 1 includes code sequence data that is temporarily stored after the embedding of digital watermarking and JPEG2000 compression. Such data also includes image data with embedded digital watermarking that is reproduced by the image reproduction unit 12, and also includes image data that is decompressed by the processes of the reversible decompression unit 13 and the irreversible decompression unit 15. Moreover, the memory 7 has an area dedicated for storage of the serial number of the image management apparatus 1 and secret information or the like supplied from an exterior of the image management apparatus 1 at the time of embedding of digital watermarking. This makes it possible to perform Hash conversion based on the serial number of the image management apparatus 1 stored in the above-noted memory area at the time of embedding of digital watermarking, which serves as a serial number identifying means.

The irreversible compression unit 8 receives the image data acquired by the image photographing unit 3 and stored in the external storage unit 6 or the memory 7, and performs irreversible compressive conversion on the digital image data, thereby generating quantization coefficients. That is, the irreversible compression unit 8 performs processing shown as "A" in FIG. 1. The quantization coefficients generated by the irreversible compression unit 8 are stored in the memory 7.

The digital-watermarking embedding unit 9 receives the quantization coefficients converted by the irreversible, compression unit 8 and stored in the memory 7, and performs the process of embedding digital watermarking into the quantization coefficients within the framework of the JPEG2000 compression process as described above. The digital-watermarking embedding unit 9 performs the process of embedding digital watermarking at the position between the "A" process and the "B" process shown in FIG. 1, as will be described later in detail. Here, randomized data (i.e., Hash-converted data) obtained by the Hash conversion unit is used as the embedded digital watermarking The Hash conversion unit 10 applies Hash conversion based on the Hash function to the quantization coefficients conforming to the JPEG2000 processing, thereby randomizing these coefficients at the time when the digital-watermarking embedding unit 9 embeds watermark information.

In this embodiment, randomizing original data to prevent no deciphering of the original data is referred to as "randomizing", which differs from "encrypting" that combines the randomizing function with the function to recover original data.

Here, the Hash function is a unidirectional random-number generating function that generates a random number by use of a parameter as a seed, and has the following characteristics (Kazue Sako, "guarantee of fairness and privacy protection," The Journal of the Institute of Electronics, Information and Communication Engineers, February, 2000):

Feature 1) impossible to estimate input values from output values;
Feature 2) complete transformation of output values in response to even a 1-bit change in input values; and
Feature 3: practically impossible to find two different inputs that produce identical outputs.

In this manner, the Hash conversion does not allow original data to be estimated from the generated data. The use of the Hash conversion for the embedding of digital watermarking thus securely prevents tampering.

The lossless compression unit 11 performs the "B" process shown in FIG. 1, thereby applying reversible conversion to the quantization coefficients with digital watermarking that is embedded by the digital-watermarking embedding unit 9. This compresses the quantization coefficients with the embedded digital watermarking without deterioration. The data compressed by the lossless compression unit 11 is stored in the external storage 6, the memory 7, or the like.

The image reproduction unit 12 controls the process of reading the JPEG2000 compressed data with embedded digital watermarking that is stored in the external storage 6 or the memory 7.

The reversible decompression unit 13 performs the "C" process shown in FIG. 1. The reversible decompression unit 13 receives the JPEG2000 compressed data retrieved by the image reproduction unit 12, and performs inverse conversion that is reverse to the conversion process of the lossless compression unit 10, thereby reconstructing the quantization coefficients in a reversible manner. The quantization coefficients decompressed by the reversible decompression unit 13 are stored in the memory 7.

Corresponding to the position between the "C" process and the "D" process shown in FIG. 1, the digital-watermarking identifying unit 14 receives the quantization coefficients reconstructed by the reversible decompression unit 13 and stored in the memory 7, and determines the presence/absence of image tampering by checking whether digital watermarking can be identified in the image data having the digital watermarking embedded therein. As will be described later in detail, the digital-watermarking identifying unit 14 decodes the digital-watermarking that is embedded by randomizing the quantization coefficients stored in the memory 7 through the Hash conversion unit. If the digital-watermarking identifying unit 14 cannot identify the digital watermarking, the position at which identification has failed is stored in the memory 7.

The Hash conversion unit 10 randomizes the quantization coefficients within the framework of the JPEG2000 processing shown in FIG. 1 by applying the Hash conversion when identifying codes by the digital-watermarking identifying unit 14.

The irreversible decompression unit 15 performs the "ID" processing shown in FIG. 1. Based on the outcome of tampering detection by the digital-watermarking identifying unit 14, the irreversible decompression unit 15 performs inverse conversion that is reverse to the conversion done by the irreversible compression unit 8.

If there is a block in which digital watermarking cannot be identified at the time of tampering detection, the alteration display control unit 16 prepares image data in which the position of such a block is painted in black. Such preparation is done by using the reconstructed image and the block position information stored in the memory 7.

In the following, a description will be given with reference to FIG. 7, regarding the operation performed by the image management apparatus 1 at the time of embedding digital watermarking. The process of FIG. 7 is performed when the image photographing unit 3 takes pictures (acquires images). Prior to image photographing by the image photographing unit 3, an operator operates input secret keys on the operation input unit 4 so as to enter secret information. This provides the functionality of a secret information input means. Such secret information may be a personal identification number comprised of two or more digits of alpha-numerals, which may be freely set by the operator.

When digital watermarking is to be embedded, the secret information entered through the operation of the input secret keys on the operation input unit 4 is stored in the memory 7 (step S1) and the image of a photographed object is stored in the memory 7 as a multi-value image (S2).

Then, color conversion is applied to the multi-value image stored in the memory 7, and the irreversible compression unit 8 performs the wavelet transform for quantization (S3). In this embodiment, the process performed at step S3 is referred to as "the JPEG2000 compression process 1", which provides a quantization means and a quantization function.

Figure 8B:
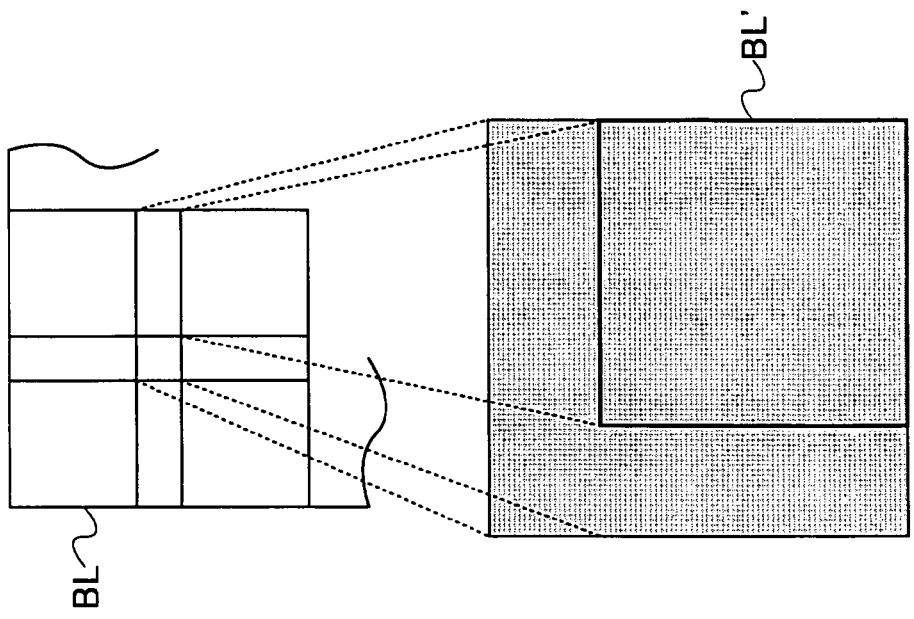
FIGS. 8A and 8B are illustrative drawings showing various ways in which blocks are divided.
Figure 8A:
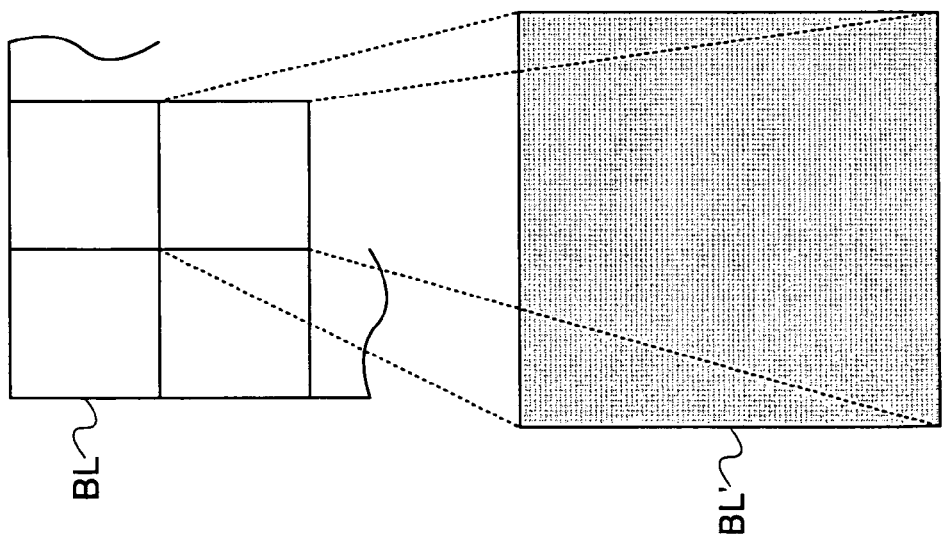

After this, the quantization coefficients quantized by the JPEG2000 compression process 1 are divided into blocks BL, each being the size of n×n (S4). This provides a block dividing means and a block dividing function. When this is done, adjacent blocks BL may be non-overlapping as shown in FIG. 8A, or may be partially overlapping as shown in FIG. 8B. The divided blocks may be the same size as the tiles used at the time of quantization at step S3, or may be a different size.

Data (seed data) is then initialized (S5), which is used as a seed for generating a random number in the processing of quantization coefficients of the divided blocks. The initialization of seed data in this manner makes it possible to identify the position of tampering on a block-specific basis if such tampering is discovered at the time of tampering detection.

Following this, the Hash conversion unit 10 obtains a new Hash value (coded Hash value) (S6) based on the secret information stored in the memory 7, information relating to the serial number of the image management apparatus 1, or information indicative of the date obtained by the timekeeping function of the microcomputer. This provides a hash conversion means and a hash conversion function.

The Hash value acquired at step S6 may not be limited to the input information (secret information) or the serial number of the image management apparatus 1, but may be based on a previously acquired Hash value or the quantization coefficients generated at step S3. Moreover, the input information stored in the memory, the serial number of the image management apparatus 1, the date, a previously acquired Hash value, and the quantization coefficients generated at step S3 may be taken alone or used in combination for the Hash value acquired at step S6. The larger the number of data items used for a Hash value, the stronger the tampering protection will be.

This embodiment uses the input information (secret information), the serial number of the image management apparatus 1, the date, etc., in addition to the quantization coefficients when performing the Hash conversion. This makes it more difficult for a third party to identify digital watermarking embedded into data.

Any information may be selected through operation on the operation input unit 4 from the input information (secret information), information relating to the serial number of the image management apparatus 1, the date information, a previously acquired Hash value, the quantization coefficients generated at step S3, etc. The information selected in such a manner may be used in addition to the quantization coefficients to be processed, to perform the Hash conversion. This provides a selection means and a selection function. Providing choices for parameters used as seeds for the Hash conversion makes it more difficult for a third party to decode the embedded digital watermarking.

A check is made as to whether a position of interest belongs to a modifiable area (S7). This check is done by determining whether the position of interest belongs to an area where adjacent blocks BL overlap. When the divided blocks BL are separate and independent from each other as shown in FIG. 8A, there is no overlapping of adjacent blocks BL, so that all the area is regarded as a modifiable area BL'. When the divided blocks BL are partially overlapping as shown in FIG. 8B, an area enclosed by thick lines illustrated in FIG. 8B is regarded as a modifiable area BL'.

If the check finds that the position of interest belongs to the modifiable area BL' (Y at S7), the parity of a quantization coefficient at the position of interest is changed to match the parity of the Hash value acquired at step S6 (S8). This provides a digital-watermarking embedding means and a digital-watermarking embedding function.

If original quantization coefficients are arranged as shown in FIG. 9A, and the Hash value of this block BL is an odd number, a quantization coefficient $Q_k$ at the position of interest is changed by an increment of "+1" or "−1" so as to become an odd number. As a result, the quantization coefficient $Q_k$ at the position of interest is set to an odd number as shown in FIG. 9B.

In this embodiment, a quantization coefficient at the position of interest is incremented by +1 at step S8 if the Hash value of the block BL where this quantization coefficient belongs is an even number and if this quantization coefficient is an odd number. The quantization coefficient at the position of interest is incremented by −1 at step S8 if the Hash value of the block BL where this quantization coefficient belongs is an odd number and if this quantization coefficient is an even number. In this manner, digital watermarking is embedded by matching parities.

For example, it is not necessary to change a quantization coefficient at the position of interest if the value of this quantization coefficient is "10" and if the Hash value of the block BL containing this quantization coefficient is an even number. If the value of this quantization coefficient is "10" and the Hash value of the block BL containing this quantization coefficient is an odd number, on the other hand, digital watermarking is embedded through an increment of "−1" (i.e., subtraction of "1") to set the quantization coefficient to "9".

When digital watermarking is to be further embedded to the quantization coefficient having a value of "9" through previous digital watermarking, for example, there is no need to change the quantization coefficient if a new Hash value is an odd number. If the new Hash value is an even number, an increment of +1 is applied according to the method as described above to set the quantization coefficient to "10" (even number). In this manner, digital watermarking can be further embedded to a quantization coefficient to which digital watermarking has already been embedded.

In the JPEG2000 compression process 1, the probability of changing a quantization coefficient by an increment of +1/−1 or using the same quantization coefficient for a subsequent processing stage is 50% if the original data is independent of and not related to the Hash value acquired at step S6.

In this method of embedding digital watermarking, the quantization coefficient having digital watermarking embedded therein (having a matching parity) is never apart by more than +1 or −1 from the original quantization coefficient even if a plurality of digital watermarks are embedded one over another. Namely, even if a plurality digital watermarks are embedded one over another into the original quantization coefficient, the quantization coefficient having digital watermarking embedded therein (having a matching parity) will always be either "9" or "10."

In this embodiment, a first method increments a quantization coefficient by +1 at the position of interest if the Hash value of the block BL containing this quantization coefficient is an even number and this quantization coefficient is an odd number, and increments the quantization coefficient by −1 if the Hash value of the block BL is an odd number and the quantization coefficient is an even number, thereby providing a matching parity. A second method increments a quantization coefficient by +1 at the position of interest if the Hash value of the block BL containing this quantization coefficient is an odd number and this quantization coefficient is an even number, and increments the quantization coefficient by −1 if the Hash value of the block BL is an even number and the quantization coefficient is an odd number, thereby providing a matching parity. In this embodiment, the first method and the second method may freely be switched to allow the use of either one of them. The setting to choose either one of the first method and the second method may be made at the time of manufacturing (prior to shipping) the image management apparatus 1. Alternatively, the operation input unit 4 may be configured to allow selective switching. This provides a method setting means and a method setting function.

Moreover, the selection of either one of the first method and the second method may be made based on the hash value obtained at step S6 and the coordinates of the quantization coefficient at the position of interest in the image. Specifically, such selection may be made according to whether the product of the Hash value and the coordinates is an odd number or an even number. Such selection of either one of the first method and the second method according to the even/odd state of the product of the Hash value and the coordinates makes it more difficult for a third party to decode the embedded digital watermarking.

Furthermore, the selection of either one of the first method and the second method may be made based on the secret information entered through the operation input unit 4 if this information is comprised of numerals. Specifically, such selection may be made according to whether the product of the hash value obtained at step S6 and the secret information entered through the operation input unit 4 is an even number or an odd number. Such selection of either one of the first method and the second method based on the hash value and the secret information makes it more difficult for a third party to decode embedded digital watermarking.

In either one of the first method and the second method, the provision of matching parities may be based on the previously described criteria when determining whether to have an increment of +1 or an increment of −1. In this manner, the quantization coefficient having digital watermarking embedded therein is never apart by more than +1 or −1 from the original quantization coefficient even if a plurality of digital watermarks are embedded one over another. This suppresses the deterioration of image quality caused by the embedding of digital watermarking.

In the example shown in FIGS. 9A and 9B, the quantization coefficient $Q_k$ at the position of interest in determining whether to embed a watermark is located at an edge where an abrupt change occurs relative to the adjacent quantization coefficient $Q_{k-1}$. If step S7 finds that the position of the quantization coefficient $Q_k$ of interest is outside a modifiable area (N at S7), no watermarking is done, and the procedure goes to step S9 without changing the original quantization coefficient.

A check is made as to whether digital watermarking is done with respect to all the quantization coefficients of interest (S9). If digital watermarking with respect to all the quantization coefficients of interest has not yet be finished (N at S9), the procedure goes to step S6, and the processes from step S6 to step S8 are performed with respect to the next quantization coefficient.

If it is ascertained that digital watermarking with respect to all the quantization coefficients in the block BL of interest is finished (Y at S9), a check is further made as to whether digital watermarking is finished with respect to all the blocks BL (S10).

If it is ascertained that digital watermarking is completed with respect to all the blocks BL (Y at S10), the lossless compression unit 11 applies lossless compression to the quantization coefficients to which digital watermarking has been completed (S11) Code sequence data generated in this manner is stored in the external storage unit 6 or in the memory 7. In this embodiment, the process performed at step S11 is referred to as "the JPEG2000 compression process 2", which provides a coding means and a coding function. In this manner, the memory 7 or the external storage unit 6 store the code sequence data into which digital watermarking is embedded.

In the following, a description will be given with reference to FIG. 10, regarding an operation that is performed by the image management apparatus 1 when detecting tampering to the code sequence data into which digital watermarking is embedded. Processing shown in FIG. 10 is performed when the image reproduction unit 12 is to reproduce images. Prior to image reproduction by the image reproduction unit 12, an operator enters secret information by operating the operation input unit 4. This secret information is the same secret information that was entered at the time of coding data that is now to be decoded.

When tampering is to be detected with respect to code sequence data having embedded digital watermarking, the secret information entered through the operation of the input secret keys on the operation input unit 4 is stored in the memory 7 (step S21). JPEG2000 compressed data (code sequence data) stored in the external storage unit 6 or the memory 7 is then reproduced by the image reproduction unit 12 (S22).

Inverse color space conversion is performed with respect to the code sequence data of an multi-value image reproduced by the image reproduction unit 12, followed by quantizing the code sequence data by the reversible decompression unit 13 (S23). In this embodiment, the process performed at step S23 is referred to as "the JPEG2000 decompression process 1", which provides a decoding means and a decoding function.

The quantization coefficients quantized by the JPEG2000 decompression process 1 are divided into blocks BL, each being the size of n×n (S24). This provides a decoded block dividing means and a decoded block dividing function. When this is done, adjacent blocks BL may be separate and independent as shown in FIG. 8A, or may be partially overlapping as shown in FIG. 8B. The divided blocks may be the same size as the tiles used at the time of quantization at step S23, or may be a different size.

Data (seed data) is then initialized (S25), which is used as a seed for generating a random number in the processing of quantization coefficients of the divided blocks. The initialization of seed data in this manner makes it possible to identify the position of tampering on a block-specific basis if such tampering to original data is discovered.

Following this, a new Hash value (decoded Hash value) is obtained (S26) based on the secret information stored in the memory 7, information relating to the serial number of the image management apparatus 1, date information, etc. This provides a decoded hash conversion means and a decoded hash conversion function. The Hash value acquired at step S26 may not be limited to the input information (secret information) or the serial number of the image management apparatus 1, but may be based on a previously acquired Hash value or the quantization coefficients generated at step S23. Moreover, the secret information stored in the memory 7, information relating to the serial number of the image management apparatus 1, the date information, a previously acquired Hash value, and the quantization coefficients generated at step S23 may be taken alone or used in combination for the Hash value acquired at step S26. The larger the number of data items used for a Hash value, the stronger the tampering protection will be.

A check is made as to whether a position of interest belongs to a modifiable area (S27). This check is done by determining whether the position of interest belongs to an area where adjacent blocks BL overlap. When the divided blocks are separate and independent from each other as shown in FIG. 8A, there is no overlapping of adjacent blocks BL, so that all the area is regarded as a modifiable area. When the divided blocks are partially overlapping as shown in FIG. 8B, an area enclosed by thick lines illustrated in FIG. 8B is regarded as a modifiable area.

If the check finds that the position of interest belongs to the modifiable area (Y at S27), a check is made as to whether the parity of a quantization coefficient at the position of interest is the same as the parity of the Hash value acquired at step S26 (S28). This provides a tampering detecting means and a tampering detecting function.

If the check finds that the parity of the quantization coefficient at the position of interest is different from the parity of the Hash value acquired at step S26 (Y at S28), the position of this block is stored in the memory 7 by ascertaining the tampering has been made at this position fo interest (S29). This provides a tampering position registering means.

If step S27 finds that the position of the quantization coefficient $Q_k$ of interest is outside a modifiable area (N at S27), no tampering detection is performed, and the procedure goes to step S30.

A check is made as to whether tampering detection is performed with respect to all the quantization coefficients in the block of interest (S30). If tampering detection with respect to all the quantization coefficients in the block of interest has not yet be finished (N at S30), the procedure goes to step S26, and the processes from step S26 to step S28 are performed with respect to the next quantization coefficient.

In this embodiment, tampering detection is performed with respect to a quantization coefficient in a block BL even if tampering has been detected at step S28 within the same block BL. Alternatively, if it is ascertained that there has been tampering to any one of the quantization coefficients in a block BL, tampering detection for other quantization coefficients in this block BL may be omitted by immediately switching to the tampering detection of a next block BL. With this provision, the load of a tampering detection process is reduced.

If it is ascertained that tampering detection with respect to all the quantization coefficients in the block BL of interest is finished (Y at S30), a check is further made as to whether tampering detection is finished with respect to all the blocks BL (S31).

If it is ascertained that tampering detection is completed with respect to all the blocks BL (Y at S31), the irreversible decompression unit 15 performs decompression with respect to the quantization coefficients to which tampering detection has been completed, thereby generating image data (S32). In this embodiment, the process performed at step S32 is referred to as "the JPEG2000 decompression process 2", which provides an image generating means and an image generating function.

An image in which the tampered block position is painted in black is presented on the display unit 5 based on the image data generated by the JPEG2000 decompression process 2 and the tampered block position registered at step S29 (S33) This provides a highlight presentation means and a highlight presentation function.

At step S33, the RGB input terminals provided on the display unit 5 are provided with the darkest signals at the tampered block position, thereby presenting the tampered block position in black.

Presentation of the tampered block position with highlighted appearance on the display unit 5 allows visual recognition of the tampered position. Moreover, presenting the tampered block position in a monochrome color makes it possible to visually recognize the position of tampering through simple processing.

In this embodiment, an image having the tampered block position painted in black is presented on the display unit 5 at step S33. Alternatively, the tampered block position may be shown in reversed colors on the display unit 5, or may be shown as painted in a single color such as a white color, a red color, or the like.

In this manner, images are presented with unnatural appearance if there is tampering. This provides for visual recognition to be made with respect to the presence/absence of tampering and the position of tampering.

Moreover, the function to detect tampering may be announced to users in advance, with an aim of deterring conscientious users from tampering.

In this embodiment, digital watermarking is embedded into quantization coefficients, so that coding and decoding processes repeated on image data do not deteriorate the embedded digital watermarking. Also, the parity of the quantization coefficients is controlled based on the hash value obtained on a block-specific basis with respect to the quantization coefficients of interest, thereby making it possible to detect the position of tampering on a block-specific basis.

If blocks are divided such as to provide a partial overlapping between adjacent blocks BL, the replacement of a whole block can also be detected as tampering. This provides the ability to detect tampering with higher accuracy.

As variation of block division, the size of an overlapping portion between adjacent blocks BL may be made adjustable, or the size of the blocks BL may be made adjustable irrespective of whether the adjacent blocks BL are partially overlapped or not. This makes it possible to adjust the processing load and processing speed of the processes for embedding digital watermarking and detecting as tampering the replacement of a whole block.

In the following, a second embodiment of the invention will be described. The same elements as those of the first embodiment are referred to by the same numerals, and a description thereof will be omitted. This applies in the remainder of the specification.

The image management apparatus 1 of this embodiment differs from that of the first embodiment in the process performed at step S8 of FIG. 7.

As a process corresponding to step S8 of FIG. 7, the image management apparatus 1 of this embodiment decomposes the quantized quantization coefficients into individual bitplanes, and matches parities by treating each bitplane as a binary image. In this process, digital watermarking data may be embedded into lower-order digits of quantization coefficients. In such a case, the bitplanes of the quantization coefficients that are to be discarded are not used, but a digit just above such bitplane is used.

With this provision, processing is carried out separately for each bitplane at the subsequent entropy coding stage. Even if some bitplanes are discarded, therefore, no harm is done by such discarding of bitplanes.

The quantization coefficient of interest is expressed in bit representation. When the quantization coefficient in this bit representation is encoded from higher-order bits to lower-order bits, digital watermarking is embedded so as to match parities with respect to those bits which are known to be valid because the coefficient of interest is known to be none-zero. With this provision, no harm is done by the discarding of lower-order bits even if these lower-order bits are disposed of at the subsequent entropy coding process.

In this embodiment, an "invalid" state as opposed to a "valid" state refers to a state in which the coefficient of interest is determined to be 0 or can still be 0 before a bit having a value "1" has not yet been encountered for coding.

In what follows, the third embodiment of the invention will be described.

The image management apparatus 1 of this embodiment differs from that of the first embodiment in the process performed at step S8 of FIG. 7.

As a process corresponding to step S8 of FIG. 7, the image management apparatus 1 of this embodiment decomposes the quantization coefficients of interest into individual bitplanes, and performs coding from higher-order bitplanes to lower-order bitplanes. When an OFF bit is to be changed to an ON bit, all the bits in the lower-order bitplanes lower than the bitplane of interest are changed to OFF. When an ON bit is to be changed to an OFF bit, all the bits in the lower-order bitplanes lower than the bitplane of interest are changed to ON. In this embodiment, an ON bit is 1, and an OFF bit is 0.

In this manner, an ON/OFF change is evenly made in the bits from higher-order bitplanes to lower-order bitplanes, thereby suppressing the degradation of image quality caused by the embedding of digital watermarking.

In the following, a fourth embodiment of the invention will be described with reference to FIG. 11 and FIG. 12.

FIG. 11 is a flowchart showing an operation that is performed by the image management apparatus 1 when embedding digital watermarking according to this embodiment.

In this embodiment, if step S7 ascertains that the position of interest belongs to a modifiable area, a check is further made as to whether the position of interest within this modifiable area is a position to be skipped (S15). This provides a quantization coefficient selection means and a quantization coefficient selection function.

If it is ascertained that the position of interest within the modifiable area is a position to be skipped (Y at S15), the procedure goes to step S8, at which the parity of the quantization coefficients in the block BL of interest are matched with the parity of the Hash value obtained at step S6.

At step S15, whether the position of interest within the modifiable area is a position to be skipped is determined by checking whether the position of interest coincides with a predetermined position to be skipped, or by checking whether a difference with an adjacent quantization coefficient is larger than a predetermined value, for example.

If it is ascertained that the position of interest within the modifiable area is not a position to be skipped (N at S15), the procedure goes to step S9.

FIG. 12 is a flowchart showing a process performed by the image-processing apparatus when tampering is to be detected in code sequence data with embedded digital watermarking.

In this embodiment, if it is ascertained that the position of interest belongs to a modifiable area (Y at S27) as shown in FIG. 12, a check is further made as to whether the quantization coefficient of interest within this modifiable area is one to be skipped (S35). If it is ascertained that the quantization coefficient of interest within the modifiable area is one to be skipped (Y at S35), the procedure goes to step S28, at which a check is made as to whether the parity matches that of the Hash value obtained at step S26.

If it is ascertained that the quantization coefficient of interest within the modifiable area is not one to be skipped (N at S35), the procedure goes to step S30.

According to this embodiment, digital watermarking is selectively embedded into quantization coefficients. Compared with the case where digital watermarking is embedded into all the quantization coefficients, the degradation of image quality caused by the embedding of digital watermarking is reduced.

As shown in FIG. 9A, the quantization coefficient $Q_k$ having a steep change (abrupt change) relative to the quantization coefficient $Q_{k-1}$, i.e., located at an edge position, may be selected as the quantization coefficient of interest. This can reduce and make less conspicuous the degradation of image quality caused by the embedding of digital watermarking, compared with the case where digital watermarking is embedded into all the quantization coefficients. In this manner, the degradation of image quality caused by the embedding of digital watermarking is effectively suppressed.

Further, the frequency of selection at which quantization coefficients are selected as the coefficients of interest in a given block BL may be made adjustable. This makes it possible to adjust the processing load and processing speed of the process for embedding digital watermarking.

Further, the present invention is not limited to these embodiments, but various variations and modifications may be made without departing from the scope of the present invention.

The present application is based on Japanese priority application No. 2002-326544 filed on Nov. 11, 2002, with the Japanese Patent Office, the entire contents of which are hereby incorporated by reference.

What is claimed is:

1. An apparatus for generating codes, comprising: a processor configured to control operation of respective units of the apparatus; a quantization unit which generates quantization coefficients by performing a discrete wavelet transform with respect to each of tiles into which an image is divided; a block division unit which divides the quantization coefficients into blocks; a hash conversion unit which performs hash conversion based on the quantization coefficients of each of the blocks so as to produce a hash value for each of the blocks; a digital watermark embedding unit which adjusts a parity of a quantization coefficient of interest equal to a parity of the has value of a block to which the quantization coefficient of interest belongs; and coding unit which generates code sequence data by coding the quantization coefficients including said quantization coefficient whose parity is adjusted.

2. The apparatus as claimed in claim 1, further comprising an information input unit which enters information, wherein said Hash conversion unit performs the Hash conversion based on the entered information in addition to the quantization coefficients.

3. The apparatus as claimed in claim 1, further comprising a date information acquiring unit which acquires date information, wherein said Hash conversion unit performs the Hash conversion based on the date information in addition to the quantization coefficients.

4. The apparatus as claimed in claim 1, further comprising a serial number detecting unit which detects a serial number of the apparatus, wherein said Hash conversion unit performs the Hash conversion based on the serial number in addition to the quantization coefficients.

5. The apparatus as claimed in claim 1, further comprising:
an information input unit which enters information;
a date information acquiring unit which acquires date information; and
a serial-number detecting unit which detects a serial number of the apparatus,
wherein said Hash conversion unit performs the Hash conversion based on at least two of the entered information, the date information, and the serial number in addition to the quantization coefficients.

6. The apparatus as claimed in claim 5, further comprising a selecting unit which selects said at least two of the entered information, the date information, and the serial number.

7. The apparatus as claimed in claim 1, wherein said digital watermark embedding unit adjusts the parity by either one of a first method and a second method, said first method incrementing the quantization coefficient by +1 if the Hash value of the block is an even number and the quantization coefficient is an odd number, and incrementing the quantization coefficient by −1 if the Hash value of the block is an odd number and the quantization coefficient is an even number, said second method incrementing the quantization coefficient by +1 if the Hash value of the block is an odd number and the quantization coefficient is an even number, and incrementing the quantization coefficient by −1 if the Hash value of the block is an even number and the quantization coefficient is an odd number.

8. The apparatus as claimed in claim 7, further comprising a method selecting unit which selects a desired one of the first method and the second method, wherein said digital watermark embedding unit adjusts the parity by the desired one of the first method and the second method selected by said method selecting unit.

9. The apparatus as claimed in claim 8, wherein said method selecting unit selects a desired one of the first method and the second method based on the Hash value and coordinates of said quantization coefficient of interest.

10. The apparatus as claimed in claim 8, wherein said method selecting unit selects a desired one of the first method and the second method based on the Hash value and information entered into the apparatus.

11. The apparatus as claimed in claim 1, wherein said block division unit divides the quantization coefficients such that adjacent blocks partially overlap.

12. The apparatus as claimed in claim 11, wherein said block division unit divides the quantization coefficients such that an overlapping area of the adjacent blocks is adjustable.

13. The apparatus as claimed in claim 1, wherein said block division unit divides the quantization coefficients such that a size of the blocks is adjustable.

14. The apparatus as claimed in claim 1, further comprising a bitplane decomposition unit which decomposes the quantization coefficients into individual bitplanes, wherein said digital watermark embedding unit adjusts the parity by changing an ON/OFF state of a bit on a bitplane-by-bitplane basis.

15. The apparatus as claimed in claim 14, wherein said digital watermark embedding unit adjusts the parity by changing the ON/OFF state of a valid bit.

16. The apparatus as claimed in claim 14, wherein said coding unit performs coding from higher-order bitplanes to lower-order bitplanes, wherein if an OFF bit is to be changed to an ON bit, all bits in the bitplanes lower than a bitplane of interest are changed to OFF, and wherein if an ON bit is to be changed to an OFF bit, all bits in the bitplanes lower than the bitplane of interest are changed to ON.

17. The apparatus as claimed in claim 1, further comprising a quantization coefficient selecting unit which selectively picks the quantization coefficient of interest.

18. The apparatus as claimed in claim 17, wherein said quantization coefficient selecting unit picks a quantization coefficient that is different from an adjacent quantization coefficient by more than a predetermined difference.

19. The apparatus as claimed in claim 17, wherein a frequency of picking by the quantization coefficient selecting unit is adjustable.

20. The apparatus as claimed in claim 1, further comprising an image inputting unit which acquires an image by optically scanning a target image, wherein said quantization unit quantizes the image acquired by said image inputting unit.

21. An image processing apparatus, comprising: a processor configured to control operation of respective units of the image processing apparatus; a decoding unit which generates quantization coefficients by decoding code sequence data; a block division unit which divides the quantization coefficients into blocks; a hash conversion unit which performs hash conversion based on the quantization coefficients of each of the blocks so as to produce a hash value for each of the blocks; and tampering detecting unit which detects presence/absence of tampering by checking whether a parity of a quantization coefficient of interest is equal to a parity of the hash value of a block to which the quantization coefficient of interest belongs.

22. The image processing apparatus as claimed in claim 21, further comprising:
an image generating unit which generates image data by performing a discrete wavelet transform with respect to the quantization coefficients;
a tampering position registering unit which stores a position of a block where tampering is detected; and
a highlight presentation unit which shows an image of the image data with the stored position of the block being highlighted.

23. A computer-readable medium having a program embodied therein for causing a computer to generate codes, said program comprising:
a quantization instruction which generates quantization coefficients by performing discrete wavelet transform with respect to each of tiles into which an image is divided;
a block division instruction which divides the quantization coefficients into blocks;
a Hash conversion instruction which performs Hash conversion based on the quantization coefficients of each of the blocks so as to produce a Hash value for each of the blocks;
a digital watermark embedding instruction which adjusts a parity of a quantization coefficient of interest equal to a parity of the Hash value of a block to which the quantization coefficient of interest belongs; and
a coding instruction which generates code sequence data by coding the quantization coefficients including said quantization coefficient whose parity is adjusted.

24. The computer-readable medium as claimed in claim 23, wherein said Hash conversion instruction performs the Hash conversion based on information entered from an exterior of the computer in addition to the quantization coefficients.

25. The computer-readable medium as claimed in claim 23, wherein said Hash conversion instruction performs the Hash conversion based on date information in addition to the quantization coefficients.

26. The computer-readable medium as claimed in claim 23, wherein said Hash conversion instruction performs the Hash conversion based on a device serial number in addition to the quantization coefficients.

27. The computer-readable medium as claimed in claim 23, wherein said Hash conversion instruction performs the Hash conversion based on at least two of information entered from an exterior, date information, and a device serial number in addition to the quantization coefficients.

28. The computer-readable medium as claimed in claim 27, said program further comprising a selecting instruction which selects at least two of the entered information, the date information, and the serial number.

29. The computer-readable medium as claimed in claim 23, wherein said digital watermark embedding instruction adjusts the parity by either one of a first method and a second method, said first method incrementing the quantization coefficient by +1 if the Hash value of the block is an even number and the quantization coefficient is an odd number, and incrementing the quantization coefficient by −1 if the Hash value of the block is an odd number and the quantization coefficient is an even number, said second method incrementing the quantization coefficient by +1 if the Hash value of the block is an odd number and the quantization coefficient is an even number, and incrementing the quantization coefficient by −1 if the Hash value of the block is an even number and the quantization coefficient is an odd number.

30. The computer-readable medium as claimed in claim 29, said program further comprising a method selecting instruction which selects a desired one of the first method and the second method, wherein said digital watermark embedding instruction adjusts the parity by the desired one of the first method and the second method selected by said method selecting instruction.

31. The computer-readable medium as claimed in claim 30, wherein said method selecting instruction selects a desired one of the first method and the second method based on the Hash value and coordinates of said quantization coefficient of interest.

32. The computer-readable medium as claimed in claim 30, wherein said method selecting instruction selects a desired one of the first method and the second method based on the Hash value and information entered from an extenor.

33. The computer-readable medium as claimed in claim 23, wherein said block division instruction divides the quantization coefficients such that adjacent blocks partially overlap.

34. The computer-readable medium as claimed in claim 33, wherein said block division instruction divides the quantization coefficients such that an overlapping area of the adjacent blocks is adjustable.

35. The computer-readable medium as claimed in claim 23, wherein said block division instruction divides the quantization coefficients such that a size of the blocks is adjustable.

36. The computer-readable medium as claimed in claim 23, said program further comprising a bitplane decomposition instruction which decomposes the quantization coefficients into individual bitplanes, wherein said digital watermark embedding instruction adjusts the parity by changing an ON/OFF state of a bit on a bitplane-by-bitplane basis.

37. The computer-readable medium as claimed in claim 36, wherein said digital watermark embedding instruction adjusts the parity by changing the ON/OFF state of a valid bit.

38. The computer-readable medium as claimed in claim 36, wherein said coding instruction performs coding from higher-order bitplanes to lower-order bitplanes, wherein if an OFF bit is to be changed to an ON bit, all bits in the bitplanes lower than a bitplane of interest are changed to OFF, and wherein if an ON bit is to be changed to an OFF bit, all bits in the bitplanes lower than the bitplane of interest are changed to ON.

39. The computer-readable medium as claimed in claim 23, said program further comprising a quantization coefficient selecting instruction which selectively picks the quantization coefficient of interest.

40. The computer-readable medium as claimed in claim 39, wherein said quantization coefficient selecting instruction picks a quantization coefficient that is different from an adjacent quantization coefficient by more than a predetermined difference.

41. The computer-readable medium as claimed in claim 39, wherein a frequency of picking by the quantization coefficient selecting instruction is adjustable.

42. A computer-readable medium having a program embodied therein for causing a computer to process images, said program comprising:

a decoding instruction which generates quantization coefficients by decoding code sequence data;

a block division instruction which divides the quantization coefficients into blocks;

a Hash conversion instruction which performs Hash conversion based on the quantization coefficients of each of the blocks so as to produce a Hash value for each of the blocks; and a tampering detecting instruction which detects a presence/absence of tampering by checking whether a parity of a quantization coefficient of interest is equal to a parity of the Hash value of a block to which the quantization coefficient of interest belongs.

43. The computer-readable medium as claimed in claim 42, said program further comprising:

an image generating instruction which generates image data by performing a discrete wavelet transform with respect to the quantization coefficients; and a highlight presentation instruction which shows an image of the image data with a block position being highlighted, said block position being a position where tampering is detected.

44. A computer-readable medium having a program embodied therein for causing a computer to execute a process, said process comprising:

generating quantization coefficients by performing discrete wavelet transform with respect to each of tiles into which an image is divided;

dividing the quantization coefficients into blocks;

performing Hash conversion based on the quantization coefficients of each of the blocks so as to produce a Hash value for each of the blocks;

adjusting a parity of a quantization coefficient of interest equal to a parity of the Hash value of a block to which the quantization coefficient of interest belongs; and generating code sequence data by coding the quantization coefficients including said quantization coefficient whose parity is adjusted.

45. A computer-readable medium having a program embodied therein for causing a computer to execute a process, said process comprising:

generating quantization coefficients by decoding code sequence data;

dividing the quantization coefficients into blocks;

performing Hash conversion based on the quantization coefficients of each of the blocks so as to produce a Hash value for each of the blocks; and detecting a presence/absence of tampering by checking whether a parity of a quantization coefficient of interest is equal to a parity of the Hash value of a block to which the quantization coefficient of interest belongs.

46. The apparatus as claimed in claim 1, wherein the digital watermark embedding unit determines whether a quantization coefficient belongs to a modifiable area in which a parity of a quantization coefficient may be adjusted by detecting whether the quantization coefficient belongs to an area where the blocks from the block division unit do not overlap.

47. The apparatus as claimed in claim 46, wherein the digital watermark embedding unit determines if a parity of a quantization coefficient in the modifiable area will be adjusted by checking whether a difference with an adjacent quantization coefficient is larger than a predetermined value.

* * * * *